(12) United States Patent
Li et al.

(10) Patent No.: US 12,248,533 B2
(45) Date of Patent: *Mar. 11, 2025

(54) EFFICIENT TRAINING AND ACCURACY IMPROVEMENT OF IMAGING BASED ASSAY

(71) Applicant: Essenlix Corporation, Monmouth Junction, NJ (US)

(72) Inventors: Xing Li, Metuchen, NJ (US); Wu Chou, Basking Ridge, NJ (US); Stephen Y. Chou, Princeton, NJ (US); Wei Ding, East Windsor, NJ (US); Ji Qi, Hillsborough, NJ (US)

(73) Assignee: Essenlix Corporation, Monmouth Junction, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,109

(22) Filed: Jan. 24, 2023

(65) Prior Publication Data
US 2023/0169151 A1 Jun. 1, 2023

Related U.S. Application Data

(63) Continuation of application No. 17/431,345, filed as application No. PCT/US2020/062445 on Nov. 25, 2020, now Pat. No. 11,593,590.

(Continued)

(51) Int. Cl.
*G06F 18/214* (2023.01)
*G06N 3/042* (2023.01)
(Continued)

(52) U.S. Cl.
CPC ......... *G06F 18/2148* (2023.01); *G06N 3/042* (2023.01); *G06N 3/045* (2023.01); *G06N 3/08* (2013.01); *G06T 5/50* (2013.01); *G06T 7/0002* (2013.01); *G06T 7/11* (2017.01); *G06T 7/70* (2017.01); *G06V 10/22* (2022.01); *G06T 2207/20021* (2013.01);
(Continued)

(58) Field of Classification Search
CPC .... G06F 18/2148; G06N 3/042; G06N 3/045; G06N 3/08; G06T 5/50; G06T 7/0002; G06T 7/11; G06T 7/70; G06T 2207/20021; G06T 2207/20081; G06T 2207/20084; G06T 2207/20221; G06T 2207/30204; G06V 10/22
See application file for complete search history.

(56) References Cited

U.S. PATENT DOCUMENTS

| 11,593,590 B2 * | 2/2023 | Li ........................ G06N 3/047 |
| 2011/0216182 A1 * | 9/2011 | Kishima ................. G02B 21/26 348/79 |

(Continued)

*Primary Examiner* — Nancy Bitar

(57) ABSTRACT

The present disclosure relates to devices, apparatus and methods of improving the accuracy of image-based assay, that uses imaging system having uncertainties or deviations (imperfection) compared with an ideal imaging system. One aspect of the present invention is to add the monitoring marks on the sample holder, with at least one of their geometric and/optical properties of the monitoring marks under predetermined and known, and taking images of the sample with the monitoring marks, and train a machine learning model using the images with the monitoring mark.

41 Claims, 11 Drawing Sheets

Related U.S. Application Data

(60) Provisional application No. 62/940,242, filed on Nov. 25, 2019.

(51) Int. Cl.
*G06N 3/045* (2023.01)
*G06N 3/08* (2023.01)
*G06T 5/50* (2006.01)
*G06T 7/00* (2017.01)
*G06T 7/11* (2017.01)
*G06T 7/70* (2017.01)
*G06V 10/22* (2022.01)

(52) U.S. Cl.
CPC ............... *G06T 2207/20081* (2013.01); *G06T 2207/20084* (2013.01); *G06T 2207/20221* (2013.01); *G06T 2207/30204* (2013.01)

(56) References Cited

U.S. PATENT DOCUMENTS

| | | | |
|---|---|---|---|
| 2016/0097116 A1* | 4/2016 | Yang | C23C 14/30 427/383.1 |
| 2017/0053398 A1* | 2/2017 | Mahoor | G06T 7/42 |
| 2019/0147215 A1* | 5/2019 | Al-Kofahi | G06T 7/0012 382/133 |

\* cited by examiner

EFFICIENT TRAINING AND ACCURACY IMPROVEMENT OF IMAGING BASED ASSAY

CROSS-REFERENCE TO RELATED APPLICATIONS

This application is a continuation of U.S. application Ser. No. 17/431,345 filed Aug. 16, 2021, which is the U.S. national stage of PCT/US2020/062445 filed Nov. 25, 2020, which claims priority benefit to U.S. Provisional Application 62/940,242 filed Nov. 25, 2019. The contents of the above-mentioned applications are incorporated herein by reference in their entireties.

FIELD

The present disclosure relates to devices, apparatus and methods of improving the accuracy of image-based assay, that uses imaging system having uncertainties or deviations (imperfection) compared with an ideal imaging system.

BACKGROUND

In image-based bio/chemical sensing and assaying (e.g., immunoassay, nucleotide assay, blood cell counting, etc.), for low cost and/or portable system, a low quality imaging system often used. However, a low quality imaging system can have an imperfection (an deviation from an ideal) in optical elements, mechanical system, and/or electrical system. Such imperfection can significantly affect the assay accuracy.

To improve an assay accuracy in an image-based assay using a low quality imaging system, machine learning methods can be used. However, simply just machine learning alone, the imperfection in imaging system creates many variable, requiring long training time, large training samples, and artifacts in imaging (hence new errors). One aspect of the present invention is to add the monitoring marks on the sample holder, with at least one of their geometric and/or optical properties of the monitoring marks under predetermined and known, and taking images of the sample with the monitoring marks, and train a machine learning model using the images with the monitoring mark.

SUMMARY

One aspect of the present invention is to add the monitoring marks on the sample holder, with at least one of their geometric and/or optical properties of the monitoring marks under predetermined and known, and taking images of the sample with the monitoring marks, and train a machine learning model using the images with the monitoring mark.

In some embodiments, the present invention provides a method of training a machine learning model for an image based assay, wherein the assay is, during a test, imaged by a low-quality imaging system, the method including the steps of: having a first sample forming a thin layer on an imaging area of a first sample holder, wherein the first sample holder is a marked sample holder comprising one or more monitoring marks on the imaging area; having a second sample forming a thin layer on an imaging area of a second sample holder, wherein the second sample holder is a marked sample holder that comprising an identical one or more monitoring marks on the imaging area of the second sample holder to the one or more monitoring marks on the first sample holder; imaging, using a low-quality imaging system, a first image of the sample on the imaging area of the first sample holder; imaging; using a high-quality imaging system, a second image of the sample on the imaging area of the second sample holder; correcting an imperfection in the first image using the monitoring marks, generating a first corrected image; correcting an imperfection in the second image using the monitoring marks, if the second image has an imperfection, generating a second corrected image; and training a machine learning model using the first corrected image, the second corrected image and the monitoring marks, generating a trained model, wherein a geometric property and optionally an optical property of the one or more monitoring marks imaged under an ideal imaging system is predetermined and known; wherein a low quality imaging system comprise more imperfection than a high quality imaging system.

In some embodiments, the method includes having a third sample forming a thin layer on an imaging area of a third sample holder, wherein the third sample holder is a marked sample holder that comprising one or more monitoring marks on the imaging area of the third sample holder identical to the one or more monitoring marks on the first sample holder; imaging, using a low-quality imaging system, a third image of the samples on the imaging area of the third sample holder; correcting, using the monitoring marks, an imperfection in the third image, generating a corrected third image; and analyzing the transformed corrected third image using the machine learning model trained in claim 1 and generating an assay result.

In some embodiments, the machine learning model comprises a cycle generative adversarial network (CycleGAN).

In some embodiments, the machine learning model comprises a cycle generative adversarial network (CycleGAN) comprising a forward generative adversarial network (forward GAN) and a backward GAN, wherein the forward GAN comprises a first generator and a first discriminator, and the backward GAN comprises a second generator and a second discriminator, and wherein training the machine learning model using each of transformed regions in the first image and each of transformed regions in the second image comprises training the CycleGAN using each of transformed regions in the first image and each of transformed regions in the second image registered at four structural elements at four corners of the corresponding regions.

In some embodiments, the first sample and the second sample are the same sample, and the first sample holder and the second sample holder are the same.

In some embodiments, the present invention provides a method to train a machine learning model for image-based assays, the method including the steps of: receiving a first image, captured by a first optical sensor, of a sample holder containing a sample, wherein the sample holder is fabricated with a standard of patterned structural elements at predetermined positions; identifying a first region in the first image based on locations of one or more structural elements of the patterned structural elements in the first image; determining a spatial transform associated with the first region based on a mapping between the locations of the one or more structural elements in the first image and predetermined positions of one or more structural elements in the sample holder; applying the spatial transform to the first region in the first image to calculate a transformed first region; and training the machine learning model using the transformed first image.

In some embodiments, the sample holder comprises a first plate, a second plate, and the patterned structural elements, and wherein the patterned structural elements comprise pillars embedded at the predetermined positions on at least one of the first plate or the second plate.

In some embodiments, the method further includes the steps of: detecting the locations of the patterned structural elements in the first image; partitioning the first image into regions comprising the first region, wherein each of the regions is defined by four structural elements at four corners of the corresponding region; determining a corresponding spatial transform associated with each of the regions in the first image based on a mapping between the locations of the four structural elements at the four corners of the corresponding region and the four predetermined positions of the four structural elements in the sample holder; applying the corresponding spatial transform to each of the regions in the first image to calculate a corresponding transformed region in the first image; and training the machine learning model using each of transformed regions in the first image, wherein the trained machine learning model is used to transform assay images from a low resolution to a high resolution.

In some embodiments, the predetermined positions of the patterned structural elements are distributed periodically with at least one periodicity value, and wherein detecting the locations of the patterned structural elements in the first image includes: detecting, using a second machine learning model, the locations of the patterned structural elements in the first image; and correcting, based on the at least one periodicity value, an error in the detected locations of the patterned structural elements in the first image.

In some embodiments, the method further includes the steps of: receiving a second image of the sample holder captured by a second optical sensor, wherein the first image is captured at a first quality level and the second image is captured at a second quality level which is higher than the first quality level; partitioning the second image into regions, wherein each of the regions in the second image is defined by four structural elements at four corners of the corresponding region in the second image and is matched to a corresponding region in the first image; determining a second spatial transform associated with a region in the second image based on a mapping between the locations of the four structural elements at the four corners of the corresponding region in the second image and the four predetermined positions of the four structural elements in the sample holder; applying the second spatial transform to each of the regions in the second image to calculate a corresponding transformed region in the second image; and training the machine learning model from transforming first quality level images to second quality level images using each of transformed regions in the first image and each of transformed regions in the second image.

In some embodiments, the machine learning model comprises a cycle generative adversarial network (CycleGAN) comprising a forward generative adversarial network (forward GAN) and a backward GAN, wherein the forward GAN comprises a first generator and a first discriminator, and the backward GAN comprises a second generator and a second discriminator, and wherein training the machine learning model using each of transformed regions in the first image and each of transformed regions in the second image comprises training the CycleGAN using each of transformed regions in the first image and each of transformed regions in the second image registered at four structural elements at four corners of the corresponding regions.

In some embodiments, training the machine learning model using each of transformed regions in the first image and each of transformed regions in the second image includes: training the first generator and the first discriminator by providing each of transformed regions in the first image to the forward GAN; training the second generator and the second discriminator by providing each of transformed regions in the second image to the backward GAN; and optimizing the forward and backward GAN training under a cycle consistency constraint.

In some embodiments, the present invention provides a method for converting an assay image using a machine learning model, the method including the steps of: receiving a first image, captured by a first optical sensor, of a sample holder containing a sample, wherein the sample holder is fabricated with a standard of patterned structural elements at predetermined positions; identifying a first region in the first image based on locations of one or more structural elements of the patterned structural elements in the first image; determining a spatial transform associated with the first region based on a mapping between the locations of the one or more structural elements in the first image and predetermined positions of one or more structural elements in the sample holder; applying the spatial transform to the first region in the first image to calculate a transformed first region; and applying the machine learning model to the transformed first region in the first image to generate a second region.

In some embodiments, the method further includes the steps of: partitioning the first image into a plurality of regions based the locations of the one or more structural elements of the patterned structural elements in the first image, wherein the plurality of regions comprises the first region; determining a respective spatial transform associated with each of the plurality of regions; applying the corresponding spatial transform to each of the plurality of regions in the first image to calculate transformed regions; applying the machine learning model to each of the transformed regions in the first image to generate transformed regions of a second quality level; and combining the transformed regions to form a second image.

In some embodiments, the present invention provides an image-based assay system including: a database system to store images; and a processing device, communicatively coupled to the database system, to: receive a first image, captured by a first optical sensor, of a sample holder containing a sample, wherein the sample holder is fabricated with a standard of patterned structural elements at predetermined positions; identify a first region in the first image based on locations of one or more structural elements of the patterned structural elements in the first image; determine a spatial transform associated with the first region based on a mapping between the locations of the one or more structural elements in the first image and predetermined positions of one or more structural elements in the sample holder; apply the spatial transform to the first region in the first image to calculate a transformed first region; and train the machine learning model using the transformed first image.

In some embodiments, the sample holder comprises a first plate, a second plate, and the patterned structural elements, and wherein the patterned structural elements comprise pillars embedded at the predetermined positions on at least one of the first plate or the second plate.

In some embodiments, the processing device is further to: detect the locations of the patterned structural elements in the first image; partition the first image into regions comprising the first region, wherein each of the regions is defined by four structural elements at four corners of the corresponding region; determine a corresponding spatial transform associated with each of the regions in the first image based on a mapping between the locations of the four structural elements at the four corners of the corresponding region and the four predetermined positions of the four structural elements in the sample holder; apply the corresponding spatial transform to each of the regions in the first image to calculate a corresponding transformed region in the first image; and train the machine learning model using each of transformed regions in the first image, wherein the trained machine learning model is used to transform assay images from a low resolution to a high resolution.

In some embodiments, the predetermined positions of the patterned structural elements are distributed periodically with at least one periodicity value, and wherein to detect the locations of the patterned structural elements in the first image, the processing device is further to: detect, using a second machine learning model, the locations of the patterned structural elements in the first image; and correct, based on the at least one periodicity value, an error in the detected locations of the patterned structural elements in the first image.

In some embodiments, the processing device is further to: receive a second image of the sample holder captured by a second optical sensor, wherein the first image is captured at a first quality level and the second image is captured at a second quality level which is higher than the first quality level; partition the second image into regions, wherein each of the regions in the second image is defined by four structural elements at four corners of the corresponding region in the second image and is matched to a corresponding region in the first image; determine a second spatial transform associated with a region in the second image based on a mapping between the locations of the four structural elements at the four corners of the corresponding region in the second image and the four predetermined positions of the four structural elements in the sample holder; apply the second spatial transform to each of the regions in the second image to calculate a corresponding transformed region in the second image; and train the machine learning model from transforming first quality level images to second quality level images using each of transformed regions in the first image and each of transformed regions in the second image.

In some embodiments, the machine learning model comprises a cycle generative adversarial network (CycleGAN) comprising a forward generative adversarial network (forward GAN) and a backward GAN, wherein the forward GAN comprises a first generator and a first discriminator, and the backward GAN comprises a second generator and a second discriminator, and wherein training the machine learning model using each of transformed regions in the first image and each of transformed regions in the second image comprises training the CycleGAN using each of transformed regions in the first image and each of transformed regions in the second image registered at four structural elements at four corners of the corresponding regions.

In some embodiments, to train the machine learning model using each of transformed regions in the first image and each of transformed regions in the second image, the processing device is further to: train the first generator and the first discriminator by providing each of transformed regions in the first image to the forward GAN; and train the second generator and the second discriminator by providing each of transformed regions in the second image to the backward GAN.

In some embodiments, the present invention provides an image-based assay system for converting an assay image using a machine learning model, including: a database system to store images; and a processing device, communicatively coupled to the database system, to: receive a first image, captured by a first optical sensor, of a sample holder containing a sample, wherein the sample holder is fabricated with a standard of patterned structural elements at predetermined positions; identify a first region in the first image based on locations of one or more structural elements of the patterned structural elements in the first image; determine a spatial transform associated with the first region based on a mapping between the locations of the one or more structural elements in the first image and predetermined positions of one or more structural elements in the sample holder; apply the spatial transform to the first region in the first image to calculate a transformed first region; and apply the machine learning model to the transformed first region in the first image to generate a second region.

In some embodiments, the processing device is further to: partition the first image into a plurality of regions based the locations of the one or more structural elements of the patterned structural elements in the first image, wherein the plurality of regions comprises the first region; determine a respective spatial transform associated with each of the plurality of regions; apply the corresponding spatial transform to each of the plurality of regions in the first image to calculate transformed regions; apply the machine learning model to each of the transformed regions in the first image to generate transformed regions of a second quality level; and combine the transformed regions to form a second image.

In some embodiment, the sample holder has one plate, and the sample is contacting one surface of the plate.

In some embodiment, the sample holder has two plate, and the sample is between the two plates.

In some embodiment, the sample holder has two plate that is movable to each other, and the sample is between the two plates.

In some embodiment, the sample holder has two plate that is movable to each other, and the sample is between the two plates. A plurality of spacers attached to at least one interior opposing surface of at least one of the plates, or both, and the plurality of spacers are situated between the opposable plates. The sample thickness is regulated by the spacers.

In some embodiments, there is at least one spacer inside the sample.

In some embodiments, the spacers are the monitoring markers.

In certain embodiments, the two plates of the device are initially on top of each other and need to be separated to get into an open configuration for sample deposition.

In certain embodiments, the two plates of the device are already in the closed configuration before the sample deposition. The sample gets into the device from a gap between the two plates.

In some embodiment, the thickness of the sample layer is 0.1 um, 0.5 um, 1 um, 2 um, 3 um, 5 um, 10 um, 50 um, 100 um, 200 um, 500 um, 1000 um, 5000 um or in a range between any of the two values.

In some embodiment, the preferred thickness of the sample layer is 1 um, 2 um, 5 um, 10 um, 30 um, 50 um, 100 um, 200 um, or in a range between any of the two values.

In certain embodiments, the spacing between two monitoring markers is 1 um, 2 um, 3 um, 5 um, 10 um, 50 um, 100 um, 200 um, 500 um, 1000 um, 5000 um or in a range between any of the two values.

In certain embodiments, the preferred spacing between two monitoring markers is 10 um, 50 um, 100 um, 200 um, or in a range between any of the two values.

In certain embodiments, the spacing between two monitoring markers is 10%, 20%, 30%, 40%, 50%, 60%, 70%, 80%, 90%, 100% or in a range between any of the two values of the lateral dimension of imaging area.

In certain embodiments, the preferred spacing between two monitoring markers is 30%, 50%, 80%, 90% or in a range between any of the two values of the lateral dimension of imaging area.

In certain embodiments, the average size monitoring markers is 1 um, 2 um, 3 um, 5 um, 10 um, 50 um, 100 um, 200 um, 500 um, 1000 um, or in a range between any of the two values.

In certain embodiments, the preferred average size monitoring markers is 5 um, 10 um, 50 um, 100 um, or in a range between any of the two values.

In certain embodiments, the average size monitoring markers is 1%, 10%, 20%, 30%, 40%, 50%, 60%, 70%, 80%, or in a range between any of the two values of the size of imaging area.

In certain embodiments, the preferred average size monitoring markers is 1%, 10%, 20%, 30%, or in a range between any of the two values of the size of imaging area.

In certain embodiment, the spacers are the monitoring markers with a height of 0.1 um, 0.5 um, 1 um, 2 um, 3 um, 5 um, 10 um, 50 um, 100 um, 200 um, 500 um, 1000 um, 5000 um or in a range between any of the two values.

In certain embodiment, the spacers are the monitoring markers with a preferred height of 1 um, 2 um, 5 um, 10 um, 30 um, 50 um, 100 um, 200 um or in a range between any of the two values.

In certain embodiment, the spacers are the monitoring markers with a height of 1%, 5%, 10%, 20%, 40%, 60%, 80%, 100% or in a range between any of the two values of the height of sample layer.

In certain embodiment, the spacers are the monitoring markers with a preferred height of 50%, 60%, 80%, 100% or in a range between any of the two values of the height of sample layer.

In certain embodiment, the shape of the monitoring markers is selected from round, polygonal, circular, square, rectangular, oval, elliptical, or any combination of the same.

In certain embodiment, the monitoring markers have pillar shape, and have a substantially flat top surface covering at least 10% of the top projection area of markers.

In certain embodiment, the inter monitoring markers distance is periodic. Traditional image-based assays may employ a high-precision microscope equipped with an imaging system to capture the images of the assays. These types of optical microscopes may be subject to the objective lens scaling rule according to which the field-of-view (FoV) is inversely proportional to the magnification power. According to the rule, the image for assaying with higher magnification power has a smaller FoV, and the one with larger FoV has less magnification power.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Definition

Figure 1:
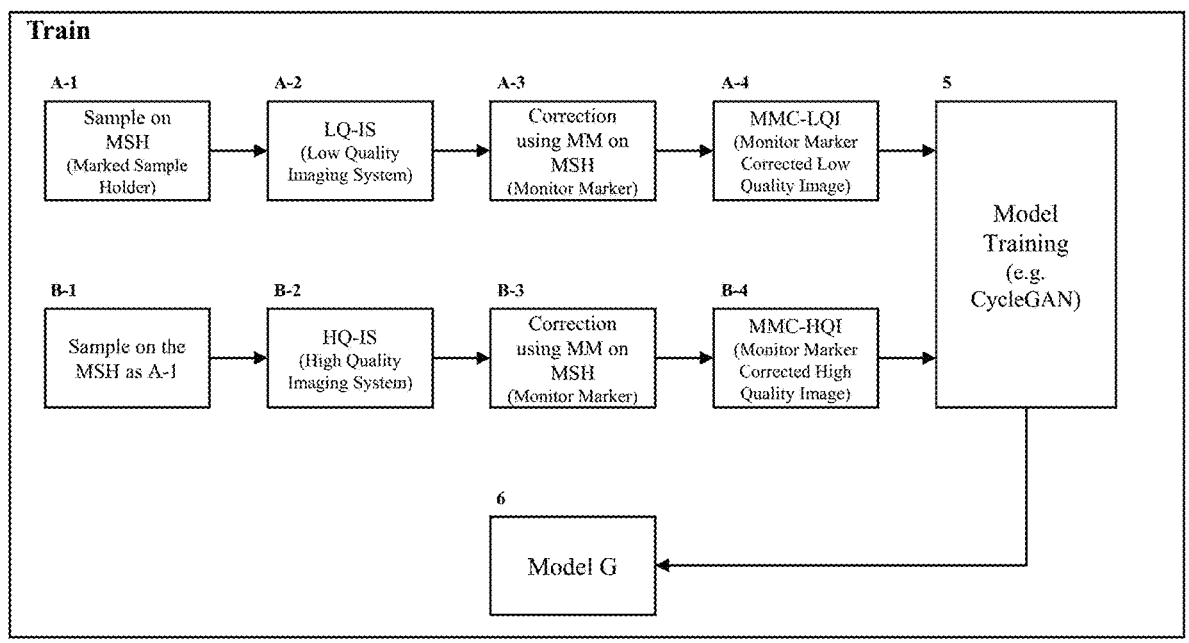
FIG. 1 training phase: place samples on the same type of the Marked Sample Holder (MSH) and use both low-quality (LQ) Imaging System and high-quality (HQ) Imaging System to capture LQ and HQ image of the sample in MMH. Images in both domains are corrected using the Monitor Markers (MM) to finalize the training data. A machine learning model is trained based on the training data for the image transformation model G.
Figure 2:
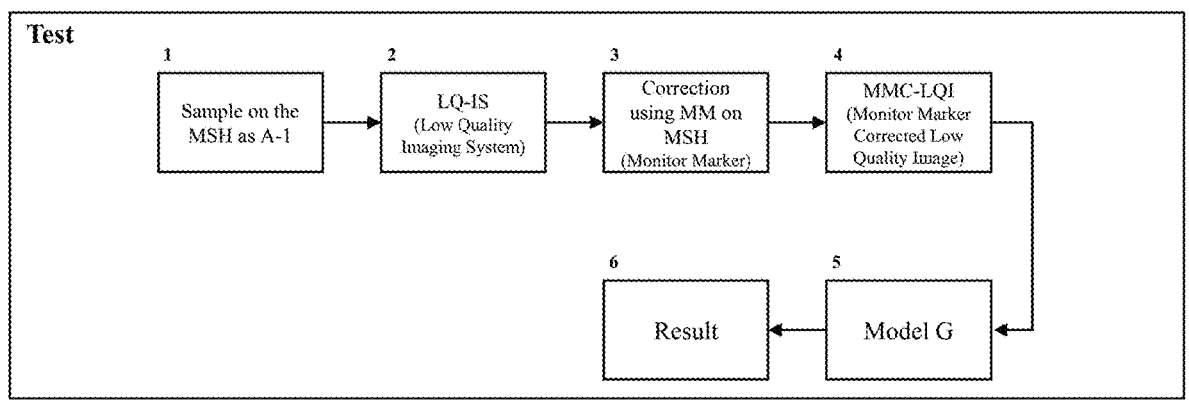
FIG. 2 prepare the Monitor Marker Corrected Low Quality Image (MMC-LQI) follow the same procedure as training stage route A. Then feed the MMC-LQI to model G for the final result.
Figure 3:
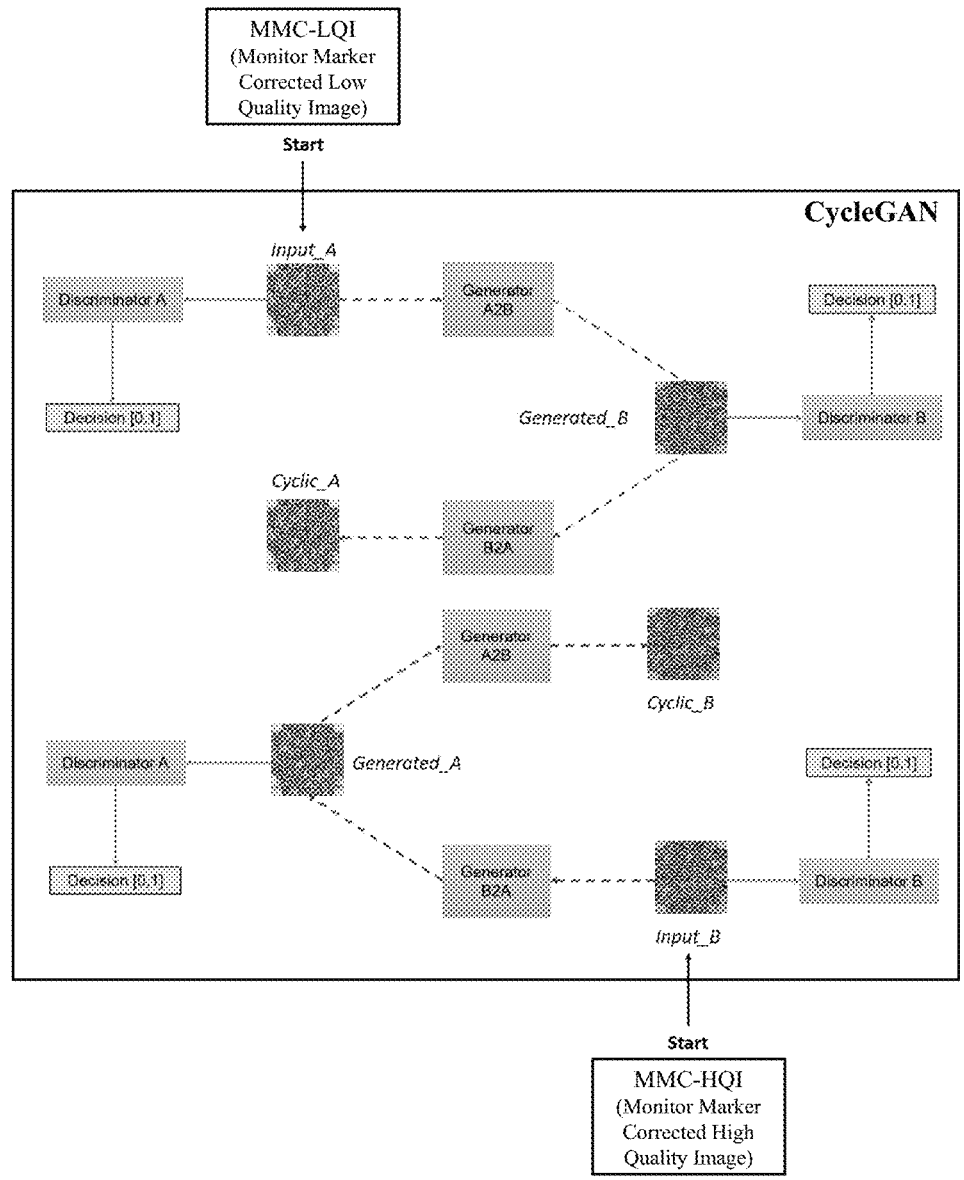
FIG. 3 illustrates detail description for Block 5 in training phase in FIG. 2.

The term "a marked sample holder" or "MSH" refer to a sample holder that has the monitoring marks.

The term "monitoring marks" or "MM" refer to one or more structures on a sample holder, wherein at least one geometrical property of the one or more structures, when viewed in an ideal imaging system is predetermined and known, wherein the geometric property comprises a dimension and/or orientation of the one or more structure, and/or the position between two of structures. In some embodiment, in additional to the predetermined and known geometric property, an optical property of the one or more structure is predetermined and known, wherein the optical property comprise light transmission, absorption, reflection, and/or scattering. optical The term "an identical marked sample holder" refers to a second marked sample holder that is fabricated precisely to have ?? that are identical to that of a first marked sample holder.

The term "an imaging system" refers to a system that is used to take image. An imaging system comprises optical elements, mechanical system, and/or electrical system, where the optical elements comprising an imager (that takes an image), light illumination, lens, filter, and/or mirror, the mechanical system comprising the mechanical stage, scanner, and/or mechanical holder, and the electrical system, comprises power supplies, wiring, and/or electronics.

The term "imperfection" refers an deviation from an ideal, wherein an imperfection can be random or non-random, and/or time dependent.

The term "monitoring mark corrected" or "MC" referred to a processed image from an original image, wherein one or more imperfection, if exist, in the original image is corrected using The term "correction" refers to a calculation using an algorithm.

The term "machine learning model" and "algorithm" are interchangeable.

The term "transformed image using the monitoring mark" and "corrected image using the monitoring mark" are interchangeable.

The term "optical sensor" in the Figures and "imaging system" are exchangeable.

In certain embodiments, "a standard of patterned structural elements at predetermined positions" are the monitoring marks.

Imperfection of Imaging system means imperfect conditions in following elements of the system:
  Optical components and conditions including but not limit to optical attenuator, beam splitter, depolarizer, diaphragm, diffractive beam splitter, diffuser, ground glass, lens, littrow prism, multifocal diffractive lens, nanophotonic resonator, nuller, optical circulator, optical isolator, optical microcavity, photonic integrated circuit, pinhole (optics), polarizer, primary mirror, prism, q-plate, retroreflector, spatial filter, spatial light modulator, virtually imaged phased array, waveguide (optics), waveplate, zone plate;
  Light illumination and conditions including but not limit to light source intensity, light source spectra, light source color, light source direction, light source brightness, light source contrast, light source wavelength band width, light source coherence, light source phase, light source polarization;
  Image sensor and photo detector components and conditions including but not limit to CCD (charge coupled device) and CMOS (complementary metal oxide semiconductor) image sensors' exposure-time, color separation, resolution, ISO, noise level, and sensitivity;
  Mechanic components and conditions including but not limit to sample holder (flatness, parallelism, surface roughness, distance to lens), scanning system (flatness, parallelism, stiffness, resolution, travel), material stability, material thermal expansion;
  Image from Imaging system conditions including but not limit to spherical distortions, noise level, resolution, brightness distribution, contrast distribution, color distribution, temperature distribution, hue distribution, saturation, lightness, rotation, artifacts;
  Time dependence of all above factors and conditions.

The term "an imaging area" of a sample holder refers to an area of the sample holder that is to be imaged by an imager.

In certain embodiments, the first image and the second images are more than one image.

The term "geometric property" of one or more monitoring marks refers to the shape, size, distance, relative position, total number, number density, area density, rotation, symmetry, periodicity, etc.

The term "optical property" of one or more monitoring marks refers to the transmission, absorptance, reflectance, fluorescence, scattering, phase contrast, polarization, color spectra, diffusion, phase change, brightness, intensity contrast, Raman scattering, nonlinear harmonic light generation, electroluminescence, radiation, IR spectra, spontaneous emission, stimulated emission, etc.

The term "an imaging area" of a sample holder refers to an area of the sample holder that is to be imaged by an imager.

In certain embodiments, the spacing between two monitoring makers is 1 um, 2 um, 3 um, 5 um, 10 um, 50 um, 100 um, 200 um, 500 um, 1000 um, 5000 um or in a range between any of the two values.

In certain embodiments, the preferred spacing between two monitoring makers is 10 um, 50 um, 100 um, 200 um, or in a range between any of the two values.

In certain embodiments, the spacing between two monitoring makers is 10%, 20%, 30%, 40%, 50%, 60%, 70%, 80%, 90%, 100% or in a range between any of the two values of the lateral dimension of imaging area.

In certain embodiments, the preferred spacing between two monitoring makers is 30%, 50%, 80%, 90% or in a range between any of the two values of the lateral dimension of imaging area.

In certain embodiments, the average size monitoring makers is 1 um, 2 um, 3 um, 5 um, 10 um, 50 um, 100 um, 200 um, 500 um, 1000 um, or in a range between any of the two values.

In certain embodiments, the preferred average size monitoring makers is 5 um, 10 um, 50 um, 100 um, or in a range between any of the two values.

In certain embodiments, the average size monitoring makers is 1%, 10%, 20%, 30%, 40%, 50%, 60%, 70%, 80%, or in a range between any of the two values of the size of imaging area.

In certain embodiments, the preferred average size monitoring makers is 1%, 10%, 20%, 30%, or in a range between any of the two values of the size of imaging area.

Traditional image-based assays may employ a high-precision microscope equipped with an imaging system to capture the images of the assays. These types of optical microscopes may be subject to the objective lens scaling rule according to which the field-of-view (FoV) is inversely proportional to the magnification power. According to the rule, the image for assaying with higher magnification power has a smaller FoV, and the one with larger FoV has less magnification power.

These high-precision microscopes are typically expensive and bulky. Thus, they are commonly used in a lab environment handled by expert human operators (e.g., a pathologist). In contrast, image-based assays where the images are captured by cameras already existing in mass mobile devices (e.g., smart phones) may provide a low-cost solution for areas such as low-cost collection and analysis of blood samples of the public. This may be particularly useful in certain healthcare situations, such as point-of-care (POC), where a large amount of assaying needs to be processed quickly and economically. However, the captured assay images using the low-cost mobile device tend to be low-quality containing variations caused by the wide range of imaging systems from the mobile devices employed to capture the images. Factors such as the resolutions and magnifying powers of different cameras and the distortions from the imaging systems or lenses behind the cameras can all vary widely, thereby severely limiting the accuracy and reliability of the image-based assaying based on these mobile devices.

Therefore, there is a need to improve the low-quality images in image-based assaying captured by such devices to a level that is comparable to those captured by high-precision imaging systems such as microscopes used in a lab environment. The improved image-based assay using such devices may overcome the limitation of objective lens scaling rule and provide accurate image-based assaying, especially using low-cost commodity optical components for medical, healthcare, POC (point-of-care), chemistry or biology generally.

In this disclosure, the term "System L" may refer to a low-quality image system (e.g. due to inconsistence in lighting/camera optics/imaging system sensor array (e.g. photodetector array), spherical distortions, high noise level in captured images, lower magnification, lower resolutions etc.).

The term "System H" refers to an high-quality image system that meets the current regulations for deployment in commercial settings. The System H commonly possesses a superior image quality compared to System L (e.g., in terms of a top line optical system with professional lighting/camera optics/imaging system sensor array, low noise level in captured images, higher magnification power, higher resolutions etc.).

In some embodiments, each of the factors such as light source, optics, and imaging system may also vary across different Systems L. This variation may be caused by lack of calibrations among different types and/or individual Systems L. The statistical distributions of these variations among different Systems L may also vary. To improve the performance of Systems L, machine learning models may be employed to compensate the variations in a specific System L. The machine learning model such as a neural network model may be customly trained for each individual System L. The customly-rained machine learning model can then be used to process the images captured by the corresponding individual System L during assaying. Although the customly-rained machine learning model may improve the performance of each individual System L, it is not suitable for deployment in a mass market because such training of each individual System L (also termed "device" or "assay device") is inefficient, time consuming, and expensive, and is therefore not practical in real world applications.

To overcome above-identified and other deficiencies in the current implementations, embodiments of the present disclosure provide technical solutions that may include a sample holder fabricated with a standard of patterned structural elements at predetermined positions, and an image enhancement method that may produce high quality image-based assays by mitigating the variations caused by individual Systems L based on the standard including patterned structure elements fabricated in the sample holder. The image enhancement method may include employment of a machine learning model and training the machine learning model in the context of assay images of samples contained in such sample holder utilizing the properties of the standard. The properties of the standard may include the geometric properties and/or the material properties of the patterned structural elements.

Embodiments of the disclosure may provide a method to train a machine learning model for image-based assays. The method may include receiving a first image, captured by a first imaging system, of a sample holder containing a sample, wherein the sample holder is fabricated with a standard of patterned structural elements at predetermined positions, identifying a first region in the first image based on locations of one or more structural elements of the patterned structural elements in the first image, determining a spatial transform associated with the first region based on a mapping between the locations of the one or more structural elements in the first image and predetermined positions of one or more structural elements in the sample holder, applying the spatial transform to the first region in the first image to calculate a transformed first region, and training the machine learning model using the transformed first image.

Embodiments of the disclosure may further include a method to process assay images using the machine learning model trained using the above-identified method. The method for converting an assay image using the machine learning model may include receiving a first image, captured by a first imaging system, of a sample holder containing a sample, wherein the sample holder is fabricated with a standard of patterned structural elements at predetermined positions, identifying a first region in the first image based on locations of one or more structural elements of the patterned structural elements in the first image, determining a spatial transform associated with the first region based on a mapping between the locations of the one or more structural elements in the first image and predetermined positions of one or more structural elements in the sample holder, applying the spatial transform to the first region in the first image to calculate a transformed first region, and applying the machine learning model to the first image to generate a second image.

Thus, embodiments of the disclosure provide a system and method that may eliminate or substantially eliminate, using the standard of the sample holder exhibiting in an assay image as reference points, variations in the assay image captured by System L. The embodiments may include converting the image into regions in a true dimension space based on the patterned structural elements in the standard, and further train a machine learning model using these regions in the true dimension space. In this way, embodiments of the disclosure may use such trained machine learning model to enhance images produced by Systems L to a quality level comparable to those produced by Systems H with little impacts by the variations caused by individual Systems L.

Figure 4:
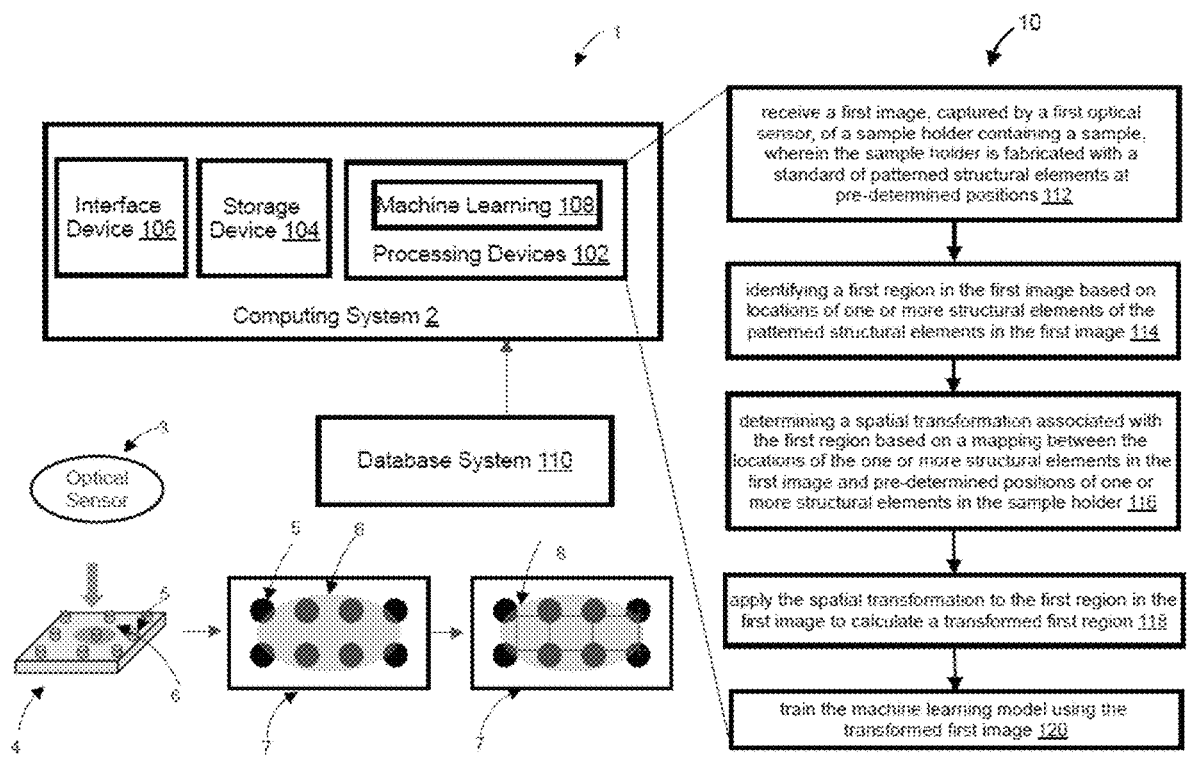
FIG. 4 illustrates an image-based assay system that may capture assay images and process the images for training a machine learning model according to an embodiment of the disclosure.

FIG. 4 illustrates an image-based assay system 1 that may capture assay images and process the images for training a machine learning model according to an embodiment of the disclosure. Referring to FIG. 4, image-based assay system 1 may include a computing system 2, an imaging system 3 (e.g., the camera of a smart phone with an adapter), and a sample holder device 4. The imaging system 3 may include a built-in light source, a lens, and an imaging system (e.g., a photodetector array). The imaging system 3 may be associated with a computing device (e.g., a mobile smart phone) for capturing assay images. Each imaging system 3 associated with an individual computing device may have its own individual variations compared with other imaging systems.

The computing system 2 as shown in FIG. 4 can be a standalone computer or a networked computing resource implemented in a computing cloud. Computing system 2 may include one or more processing devices 102, a storage device 104, and an interface device 106, where the storage device 104 and the interface device 106 are communicatively coupled to processing devices 102.

A processing device 102 can be a hardware processor such as a central processing unit (CPU), a graphic processing unit (GPU), or an accelerator circuit. Interface device 106 can be a display such as a touch screen of a desktop, laptop, or smart phone. Storage device 104 can be a memory device, a hard disc, or a cloud storage 110 connected to computing system 2 through a network interface card (not shown). Processing device 102 can be a programmable device that may be programmed to implement a machine learning model 108. The implementation of machine learning model 108 may include the training the model and/or the application of the trained model to image-based assay data.

Imaging system 3 in image-based assay system 1 can be the imaging system of a System L. For example, imaging system 3 may include the build-in image sensing photodetector array of a smart phone that is available in a consumer marketplace. Image-based assay system 1 may also include a sample holder device 4 for holding a sample 6 (e.g., a biological sample or a chemical sample) therein. Sample holder device 4 can be a QMAX card that is described in detail in International Application No. PCT/US2016/046437. Sample holder device 4 may include two plates that, when in a close configuration, are parallel to each other, wherein at least one of the two plates is transparent Imaging system 3 may be used to capture an assay image of the sample 6 contained in sample holder device 4 through the transparent plate so that computing system 2 may analyze the sample based on the assay image.

The assay images captured by imaging system 3 of a System L are typically low-quality and are not suitable for further analysis by an expert human operator or by a computer analysis program. The low quality may be reflected in the high level of noise, distortions, and low resolution in the captured images. A machine learning model 108 may be used to enhance the quality of the assay images. However, as discussed above, the machine learning model 108 may be ineffective when directly applied to assay images because the characterization parameters (e.g., FoV, magnifying powers, or resolutions) of the imaging systems 3 used to capture the assay images may vary in a wide range. To mitigate the variations among imaging systems 3 of different Systems L, in one embodiment, the sample holder device 4 may be fabricated with a standard 5 of patterned structural elements. These patterned structural elements in standard 5 are precisely-fabricated on an inner surface of at least one plate of the sample holder device 4. Thus, the positions of these patterned structural elements are precise and consistent in the true dimension space on the inner surface. In one embodiment, the structural elements may have different optical characteristics than sample 6. Thus, these structural elements when captured along with sample 6 may provide reference points for correcting the variations caused by different imaging systems 3.

In one embodiment, the structural elements can be pillars perpendicularly fabricated on an inner surface of the sample holder device 4. The fabrication of these pillars may include grow a nano material on the inner surface. Each pillar may have the three-dimensional shape of a cylinder that includes a certain height, and a cross-section having a certain area and a certain two-dimensional shape to make the cross-section detectable from the image of the sample holder device. Sample holder device 4 may include a first plate and a second plate. These pillars may be precisely fabricated at predetermined positions on the inner surface of the first plate or the second plate, where the inner surfaces of the first and second plates are the ones that face each other when the sample holder device 4 is in the close configuration. Sample 6 may be provided on the inner surface of the first plate or on the inner surface of the second plate when the sample holder device 4 is at the open configuration. After sample holder device 4 is closed so that sample 6 is enclosed within the holder and sandwiched between the first and second plates, sample holder device 4 may be inserted into an adapter device (not shown) that is mounted on the computing device associated with imaging system 3. The adapter device may hold the sample holder device 4 to stabilize the relative position between the sample holder device 4 and imaging system 3 so that the imaging system 3 can be activated to capture the assay image 7. The captured assay image 7 in its digital form may include pixels representing the sample and the cross-section areas of the pillars. The captured assay image 7 may be uploaded to a database system 110 to be used in training machine learning model 108 or analyzed using the trained machine learning model 108.

The first or second plate may be made from transparent materials. Thus, imaging system 3 with assistance of a light source provided in the adapter may capture an assay image 7 containing pixels representing both the cross-sections of pillars 5 and sample 6. Assay image 7 may include distortions (both linear and non-linear) caused by many factors associated with Systems L. The factors may include the imprecise coupling between the sample holder device 4 and the adapter, and the characteristic variations inherently existing in imaging systems 3. These distortions if not corrected may adversely impact the performance of machine learning model 108.

Embodiments of the disclosure may use the positions of pillars 5 to determine and correct these distortions. In one embodiment, pillars 5 are fabricated at predetermined position on an inner surface. The positions of these pillars may be located according to a pattern. For example, the positions of these pillar may form a rectangular array that has a horizontal periodicity and a vertical periodicity in the sense that the horizontal distance (dx) between any two adjacent pillars is the same and the distance (dy) between any two adjacent pillars is the same in the true dimension space. Because the positions of these pillars are predetermined during the manufacture of the sample holder device 4, the detected positions of these pillars in assay image 7 may be used to determine and correct distortions therein.

Embodiments of the disclosure may include a method 10 to train machine learning model 108 for enhancing image-based assays. Processing devices 102 may be configured to perform method 10. At 112, processing devices 102 may receiving a first image, captured by a first imaging system, of a sample holder containing a sample, wherein the sample holder is fabricated with a standard of patterned structural elements at predetermined positions. The first image can be an assay image 7 captured by imaging system 3, the first image including pixels representing pillars 5 and sample 6. The sample 5 can be a biological sample such as a drop of blood or a chemical sample. As discussed above, the standard of patterned structural elements may include pillars perpendicularly fabricated on an inner surface of a plate of the sample holder device 4. The predetermined positions of these pillars may form a rectangular array with pillar areas separated by uniform distances in the horizontal and vertical directions.

At 114, processing devices 102 may identify a first region in the first image based on locations of one or more structural elements of the patterned structural elements in the first image. In this regard, processing devices 102 may first detect, in assay image 7, the locations of the patterned structural elements in the first image. Because the optic property (e.g., transparency) and shape of the cross-sections of pillars are designed to be different than that of the analyte in the sample, the pillars can be differentiated from the sample in assay image 7. Embodiments of the disclosure may include any suitable image analysis methods for detecting the locations of the pillars. The methods to detect the locations of pillars may be based on the pixel intensity values or morphological properties of regions.

In one embodiment, a second machine learning model may be trained for detecting locations of pillars in assay image 7. The second machine learning model can be a neural network such as the RetinaNet which is one-stage object detection model suitable for detecting dense and small scale objects. In a forward propagation of the training, training assay images are fed into the second machine model to generate a result image including detected regions of pillars. The result image including detected regions of pillars may be compared with regions of pillars labeled by a human operator. In a backward propagation of the training, parameters of the second machine learning model may be adjusted based on the difference between the detected regions and the labeled regions. In this way, the second machine learning may be trained for the detection of pillars in assay images.

Embodiments of the disclosure may include detecting regions corresponding to the pillars in the assay image 7 using the trained second machine learning model. Although the application of the trained second machine learning model to assay image 7 may generate better pillar detection results than other approaches, the detection results may still include missed detections and false detections of pillars. Embodiments of the disclosure may further include a detection correction step to identify missed detection and remove false detection of the pillars. In one embodiment, processing devices 102 may perform the detection correction step based on the periodic distribution pattern of pillars. For any position in the periodic distribution pattern that misses a corresponding pillar, processing devices 102 may insert a corresponding pillar in the detection results based on the horizontal and/or vertical periodicity of the pattern; for any pillar that is not located at a position in the periodic distribution pattern, processing devices 102 may determine the pillar as a false alarm based on the horizontal and/or vertical periodicity of the pattern and remove it from the detection results.

Based on the locations of pillars in the assay image 7, processing devices 102 may further partition the first image into regions, wherein each of the regions is defined by detected pillars in assay image 7. When the pillars are arranged according to a rectangular array in the true dimension space of the sample holder device 4, assay image 7 may be partitioned into regions 8 that each is defined by four adjacent pillars at the four corners. For example, a region may be defined by four lines drawn from centers of the pillar areas. However, due to distortions existing in imprecise coupling between the sample holder device 4 and the adapter and in imaging system 3, each region may not be a rectangular region corresponding to its physical shape in the true dimension space as fabricated on the inner surface of sample holder device 4. Instead of a rectangular, each region may be warped into a quadrilateral due to these distortions. Further, the distortions can be non-uniform across the whole assay image 7 (e.g., due to the limited FoV), resulting in different warping effects for different regions.

Embodiments of the disclosure may mitigate the distortions by projecting each region back into the true dimension space. Referring to FIG. 4, at 116, processing devices 102 may determine a spatial transform associated with the first region based on a mapping between the locations of the one or more structural elements in the first image and predetermined positions of one or more structural elements in the sample holder. Each quadrilateral region defined by four pillar areas at four corners may correspond to a rectangular in the true dimension space of sample holder device 4 defined by four corresponding pillars. Thus, the parameters of the spatial transform may be determined based on the mapping between the four detected pillar areas in assay image 7 and the four pillars in the true dimension space. In one embodiment, the spatial transform can be a homographic transform (perspective transform) that may map the quadrilateral plane defined by the four detected pillar areas to the rectangular plane of its true physical shape defined by the four corresponding pillars, where each pillar area may be represented by a center of the area, and each pillar may be represented by a center of its cross-section. Processing devices 102 may determine a respective homographic transform for each region in assay image 7. Thus, processing device 102 may mitigate the distortions associated with each region using the homographic transform associated with the region.

At 118, processing devices 102 may apply the spatial transform to the first region in the first image to calculate a transformed first region. Processing devices 102 may apply the determined spatial transform to pixels in each region to transform the region to the true dimension space, thereby substantially eliminating the distortions associated with the region. In this way, embodiments of the disclosure may use predetermined positions of pillars in the true dimension space defined on an inner surface of the sample holder device to mitigate or substantially remove the distortions of a System L.

At 120, processing device 102 may train the machine learning model 108 using the transformed first image. Machine learning model 108 may be trained to enhance assay images captured by Systems L to the quality level comparable to those captured by Systems H. The quality may be reflected in terms of noise level, distortion, and/or the resolutions. The training dataset may include the partitioned regions that have been transformed into the true dimension space. Thus, the training dataset is less impacted by the distortions caused by Systems L. In one embodiment, the training dataset may include transformed regions from multiple assay images captured by imaging systems of Systems L.

For the training purpose, the training dataset may also include the corresponding regions in assay images captured by Systems H. Assay images captured by Systems H are high quality and suitable for analysis by an expert human operator (e.g., a clinical pathologist) or by a computer assay analysis program. To construct the training dataset, for each assay image 7 captured by a System L of a sample holder device 4 containing sample 6, the System H may also capture a high-quality assay image. Processing devices 102 may similarly partition the high-quality assay image into regions defined by pillars.

Figure 5:
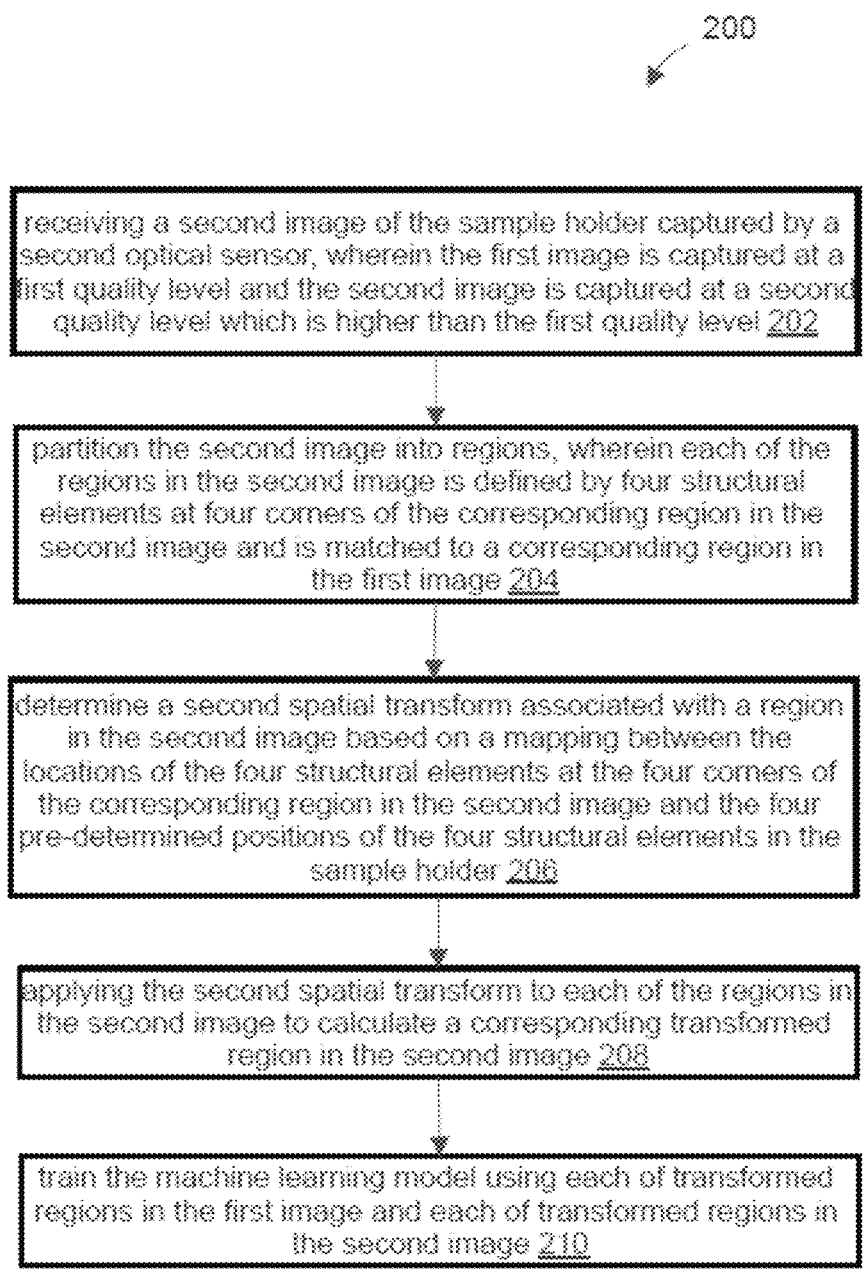
FIG. 5 depicts a flow diagram of a method to prepare the high-quality assay images in the training dataset according to an embodiment of the disclosure.

FIG. 5 depicts a flow diagram of a method 200 to prepare the high-quality assay images in the training dataset according to an embodiment of the disclosure. Method 200 may be performed by processing devices 102. At 202, processing devices 102 may receive a second image of the sample holder captured by a second imaging system, wherein the first image is captured at a first quality level and the second image is captured at a second quality level which is higher than the first quality level. As discussed above, subsequent to capturing the first assay image of the sample holder device 4 using the imaging system 3 of a System L, a second assay image of the same sample holder device 4 may be captured using a System H. The second assay image may have a higher quality than the corresponding first assay image. The higher quality may be reflected in a higher resolution, a lower noise level, and/or a less distortion. The second assay image may be at a level that can be directly used in a lab environment for an expert human operator to analyze the content of the sample using the second assay image. In one embodiment, the second assay image may be captured using a microscope in a controlled environment with proper lighting and calibrated optics so that the captured second assay image may be less impacted by distortions compared to the first assay image captured by a System L. The high-quality second assay image may have been stored in database system 110 after capturing so that processing devices 102 may retrieve the second assay image from the database.

At 204, processing devices 204 may partition the second image into regions, wherein each of the regions in the second image is defined by four structural elements at four corners of the corresponding region in the second image. The second assay image may be partitioned in a manner similar to the partitioning of the corresponding first assay image. The partitioning of the second assay image may include detecting pillar areas in the second assay image, and correcting, based on the periodicity of the pillar locations, any missing pillar areas and/or false pillar areas. Each region in the second assay image may be a quadrilateral that is defined by four adjacent pillar areas at four corners.

Based on the locations of detected pillars in the assay image, processing devices 102 may further partition the first image into regions, wherein each of the regions is defined by detected pillars in the assay image. When the pillars are arranged according to a rectangular array in the true dimension space of the sample holder device 4, the second assay image may also be partitioned into regions that each is defined by four adjacent pillar areas at the four corners. However, due to distortions existing in imprecise coupling between the sample holder device 4 and the adapter and in imaging system 3, each region may not be a rectangular region corresponding to its physical shape in the true dimension space as fabricated on the inner surface of sample holder device 4. Similar to the processing of the first assay image, the distortion associated with each region in the second assay image may be corrected using a spatial transform.

At 206, processing devices 102 may determine a second spatial transform associated with a region in the second image based on a mapping between the locations of the four structural elements at the four corners of the corresponding region in the second image and the four predetermined positions of the four structural elements in the sample holder. In one embodiment, each quadrilateral region defined by four detected pillar areas in the second assay image may correspond to a rectangular in the true dimension space of sample holder device 4 defined by four corresponding pillars. Thus, the parameters of the second spatial transform may be determined based on the mapping between the four detected pillar areas in the second assay image and the four pillars in the true dimension space. In one embodiment, the spatial transform can be a homographic transform (perspective transform) that may map the quadrilateral plane defined by the four detected pillar areas in the second assay image to the rectangular plane defined by the four corresponding pillars in the sample holder. In another embodiment, instead of determining a respective second spatial transform for each region in the second assay image, processing devices 102 may determine a global second spatial transform for all regions in the second assay image. This is possible because the second assay image captured by a System H may include a more uniform distortion across all regions due to the high quality of the imaging system of System H. Thus, a global second spatial transform may be sufficient to correct the uniform distortion. The global second spatial transform may be determined using the pillar areas associated with one of the regions in the second assay image. Alternatively, the global second spatial transform may be determined as an average of second spatial transforms associated with multiple regions in the second assay image.

At 208, processing devices 102 may apply the second spatial transform to each of the regions in the second image to calculate a corresponding transformed region in the second image. The second spatial transform can be a global transform or a local transform. The application of the second spatial transform may transform the regions in the second assay image to the true dimension space on the inner surface of the sampler holder device, and thus mitigate the distortions associated with the second assay image. For each of first assay images in the training dataset, processing devices 102 may prepare a corresponding second assay image. Processing devices 102 may place the transformed regions in the second assay images in the training dataset.

At 210, processing devices 102 may train the machine learning model using each of transformed regions in the first image and each of transformed regions in the second image. The machine learning model 108 may be trained using the training dataset including the transformed regions of the first assay images and their corresponding regions of the second assay images, where both the transformed regions of the first assay images and their corresponding regions of the second assay images are mapped into the true dimension space to mitigate the distortions existing in Systems L and Systems H. In this way, the individual system variations are substantially removed, and the regions of the first assay images and regions of the second assay images are mapped to a common true dimension space using the standard information embedded in the assay images.

Machine learning model 108 is a model that is built from training data including examples. In this disclosure, the examples include regions of the first assay images and their corresponding regions in the second assay image in the training dataset. These regions in the training dataset are already corrected for the distortions by transforming into the true dimension space defining the positions of the pillars on the inner surface of the sample holder device 4. Embodiments may use the trained machine learning model 108 to enhance the assay images captured by Systems L to a quality level comparable to those captured by Systems H.

Machine learning model 108 can be any suitable model including but not limited to deep neural network (DNN), convolutional neural network (CNN), recurrent neural network (RNN), generative adversarial network (GAN), graph neural network (GNN) etc. All of these models may include parameters that can be adjusted during training based on training dataset or examples.

The mapping from assay images of Systems L to assay images of Systems H can belong to a class of image-to-image transformation problems. The training of the machine learning model used in image-to-image transformation may require a large quantity of perfectly matched paired examples from the source images (assay images captured by Systems L) to the target images (assay images captured by Systems H). In the context of assay images, the sample contained in the sample holder is commonly a type of liquid in which the minute analytes may move constantly between the images taken by different imaging systems (e.g., System L and then System H). Therefore, it is not practical if not impossible to construct a sufficiently large training dataset containing perfectly matched pairs of low-quality and high-quality assay image examples for training a machine learning model used for image transformation. To overcome this practical problem in the transformation of assay images, embodiments of the present disclosure employ the cycle generative adversarial network (CycleGAN) model that may be trained using unpaired assay images. Although the regions partitioned from the low-quality assay image are not paired with the corresponding regions partitioned from the high-quality assay image due to the movement of the analyte in the sample and other factors, the pillar areas at the corners of regions in the low-quality assay image are matched to the pillar areas at the corners of the high-quality assay image because they are physically fixed in the true dimension space during the precise fabrication of the sample holder. The matched pillar areas embedded in the assay images in the present disclosure provide registered landmarks information and additional constraints that help further improve the training of the CycleGAN and the fidelity of the transformed image for assaying purposes.

Figure 6:
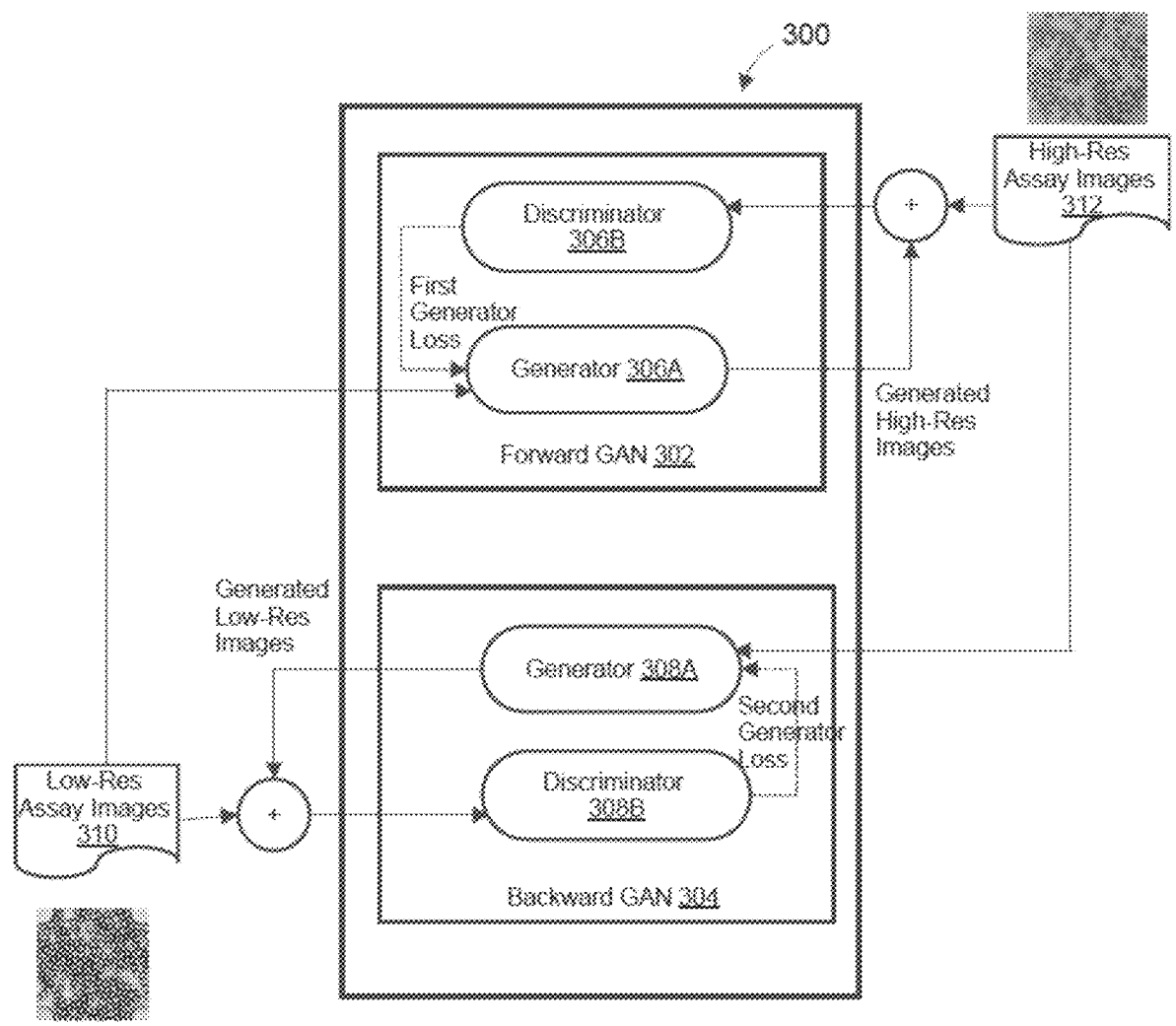
FIG. 6 illustrates the construction of a cycle generative adversarial network (CycleGAN) model used for assay image-to-image translation according to an embodiment of the disclosure.

The CycleGAN model is composed of a forward GAN and a backward GAN. FIG. 6 illustrates the construction of a CycleGAN model 300 used for assay image-to-image translation according to an embodiment of the disclosure. Referring to FIG. 6, CycleGAN model 300 may include a forward GAN 302 and a backward GAN 304. Forward GAN 302 like a typical GAN model may include a generator 306A and a discriminator 306B; similarly, backward GAN 304 may also include a generator 308A and a discriminator 308B. Each of generators 306A, 308A and discriminators 306B, 308B can be a neural network (e.g., a multi-layered convolutional neural network). Generators 306A, 308A may convert an input assay image in a first domain (e.g., having a first quality or first resolution) into an output assay image in a second domain (e.g., having a second quality of second resolution).

Generator 306A may convert assay images 310 in a first image domain (domain L) into generated assay images in a second image domain (domain H). For example, generator 306A may convert low-resolution assay images captured by Systems L into generated high-resolution assay images with a same resolution as those captured by Systems H. Generator 308A may convert assay images 312 in the domain H into generated assay images in domain L For example, generator 308A may convert high-resolution assay images captured by Systems H into generated low-resolution assay images in domain L. Discriminator 306B may compare the generated assay images in domain H with real assay images in domain H to output a first generator loss function and a first discriminator loss function. The first generator loss function may indicate whether the generated assay images in domain H belong to domain H (or "real") or not (or "fake"). The first discriminator loss function (not shown) may indicate whether the discriminator 306B makes the correct classification of "real" or "fake." Discriminator 308B may compare the generated assay images in domain L with real assay images in domain L to output a second generator loss function and a second discriminator loss function. The second generator loss function may indicate whether the generated assay images in domain L belong to domain L (or "real") or not (or "fake"). The second discriminator loss function (not shown) may indicate whether the discriminator 308B makes the correct classification of "real" or "fake."

During training, the first discriminator loss function may be used in a backpropagation to train the discriminator 306B, and the first discriminator loss function may be used in a backpropagation to train the discriminator 308B. The parameters of generator 306 may be adjusted in a backpropagation based on the first generator loss function from discriminator 306B so that generator 306A may produce generated assay images in domain H considered by discriminator 306B as "real." Similarly, the parameters of generator 308A may be adjusted in a backpropagation based on the second generator loss function from discriminator 308B so that generator 308A may produce generated assay images in domain L considered by discriminator 306B as "real." Discriminator 306B, 308B and generator 306A, 308A contained in a GAN 302, 304 may be trained in alternative time periods. For example, discriminator 306B, 308B may be trained in several epochs in step 1, and then generator 306A, 308A may be trained in subsequent several epochs in step 2. The steps 1 and 2 may be repeated alternatively during training until each of the GANs 302, 304 converges.

In one optional embodiment, the CycleGAN 300 may require the cycle consistency. The cycle consistency requires that the combined transformation of generator 306A and generator 308A results in an identity cycle mapping. The identity mapping means that generator 306A may convert an input assay image to a generated assay image, and generator 308A may convert the generated assay image back to the original input assay image. The cycle consistency requirement may allow CycleGAN 300 to work using unpaired images to train the image transformation model. Further, embodiments of the present disclosure provide additional constraints such as the registered landmark information of the pillar areas to output high-fidelity transformed assay images and position correspondence of the transformed assay images for assaying purposes.

In the context of the present disclosure, low-resolution images 310 may include regions partitioned based on detected pillar areas from assay images captured by imaging system 3, and high-resolution images 312 may include the corresponding regions partitioned based on detected pillar areas from assay images captured by a high-quality imaging system built in a microscope, where all the assay image regions have been transformed into the true dimension space to mitigate the distortions. In training of the forward GAN 302, a first assay image region from low-resolution images 310 may be provided to generator 306A to produce a generated first region in the high resolution domain. Discriminator 306B may compare the generated first region with the corresponding first region assay image in high-resolution assay images 312 to produce the first generator loss function and first discriminator loss function. The first discriminator loss function may be used in a backpropagation to train discriminator 306B, and the first generator loss function may be used in a backpropagation to train generator 306A. Each assay image region in low-resolution images 310 may be similarly used to train generator 306A and discriminator 306B of the forward GAN 302. In training of the backward GAN 304, a second assay image region from high-resolution images 312 may be provided to generator 308A to produce a generated second region in the low resolution domain. Discriminator 308B may compare the generated second region with the corresponding second region assay image in low-resolution assay images 310 to produce the second generator loss function and second discriminator loss function. The second discriminator loss function may be used in a backpropagation to train discriminator 308B, and the second generator loss function may be used in a backpropagation to train generator 308A. Each assay image region in high-resolution images 312 may be similarly used to train generator 308A and discriminator 308B of the backward GAN 304.

Figure 7:
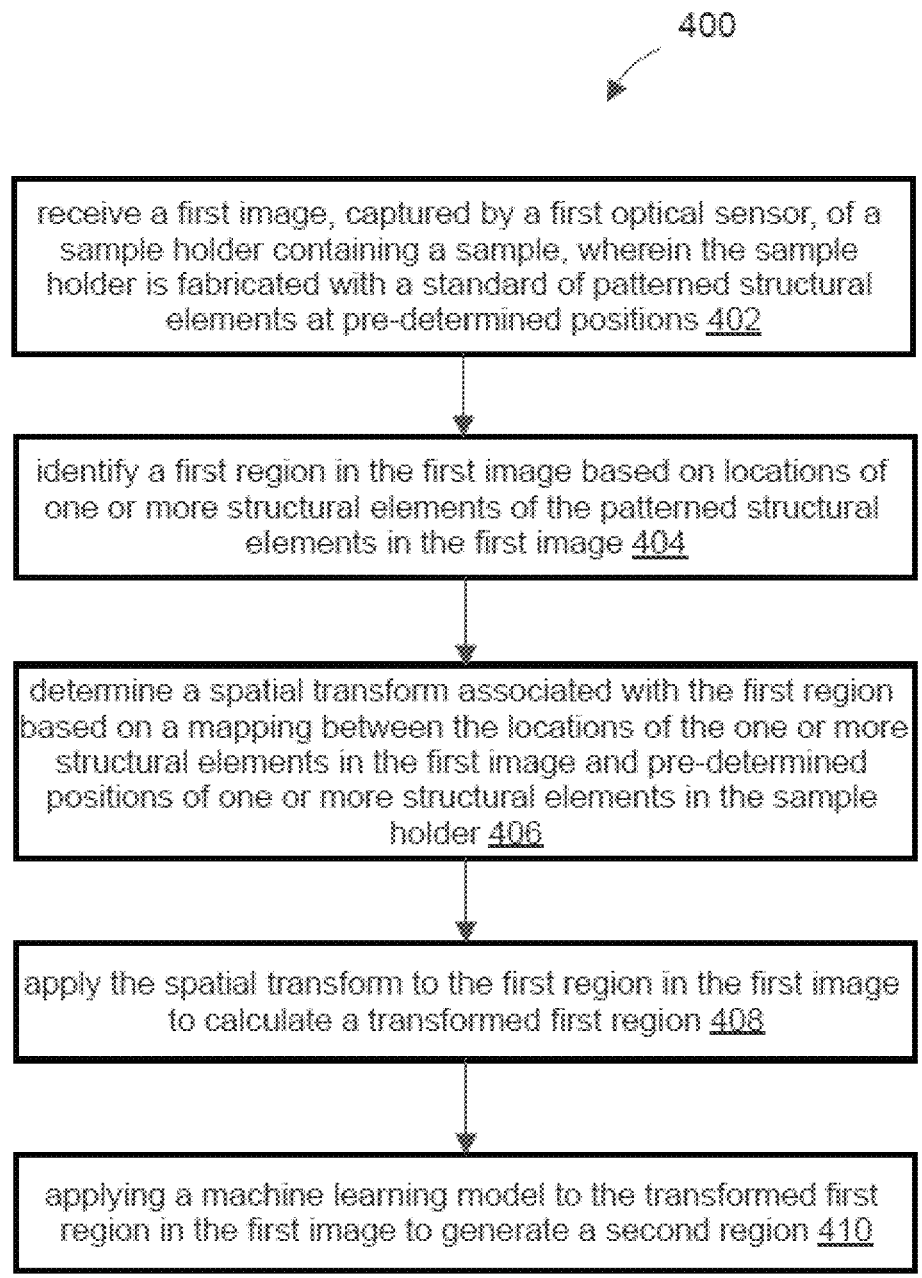
FIG. 7 depicts a flow diagram of a method to enhance a low-quality assay image according to an embodiment of the disclosure.

In application, the trained CycleGAN 300 may be used to convert an assay image captured by imaging system 3 to a generated assay image at a quality level comparable to those captured by a microscope. FIG. 7 depicts a flow diagram of a method 400 to enhance a low-quality assay image according to an embodiment of the disclosure. One or more processing devices (e.g., processing devices 102) may perform the operations of method 400.

At 402, the processing devices may receive a first image, captured by a first imaging system, of a sample holder containing a sample, where the sample holder is fabricated with a standard of patterned structural elements at predetermined positions. The first image can be a first assay image including pixels representing the sample and the structural elements such as pillars.

At 404, the processing devices may identify a first region in the first image based on locations of one or more structural elements of the patterned structural elements in the first image. The identification of the first region may include detecting pillar areas in the first image and identifying the first region based on four adjacent pillar areas at four corners. The first region can be a quadrilateral due to distortions associated with the first image.

At 406, the processing devices may determine a spatial transform associated with the first region based on a mapping between the locations of the one or more structural elements in the first image and predetermined positions of one or more structural elements in the sample holder. The spatial transform can be a homographic transform. The parameters of the spatial transform can be determined based on a mapping of the positions (e.g., the centers) of the four pillar areas at the four corners of the first region with the positions (e.g., the centers of cross-sections) of the four pillars on the true dimension space on an inner surface of the sample holder device.

At 408, the processing devices may apply the spatial transform to the first region in the first image to calculate a transformed first region. The application of the spatial transform to the first region may help remove the distortions based on the positions of the pillars.

At 410, the processing devices may apply a machine learning model to the transformed first region in the first image to generate a second region. The machine learning model can be the generator 306A as shown in FIG. 6. In one embodiment, the second image region may have a higher resolution than the first image region. For example, the second image region may be at a resolution of microscopic image.

The processing devices may further process each identified region in the first image according to steps 402-404 to generate a corresponding high-resolution region. Further, processing devices may recombine these generated high-resolution regions to form a second image which is a high-resolution version of the first image. The second image may be analyzed by an expert human operator or by another intelligent computer system for its contents.

Figure 8:
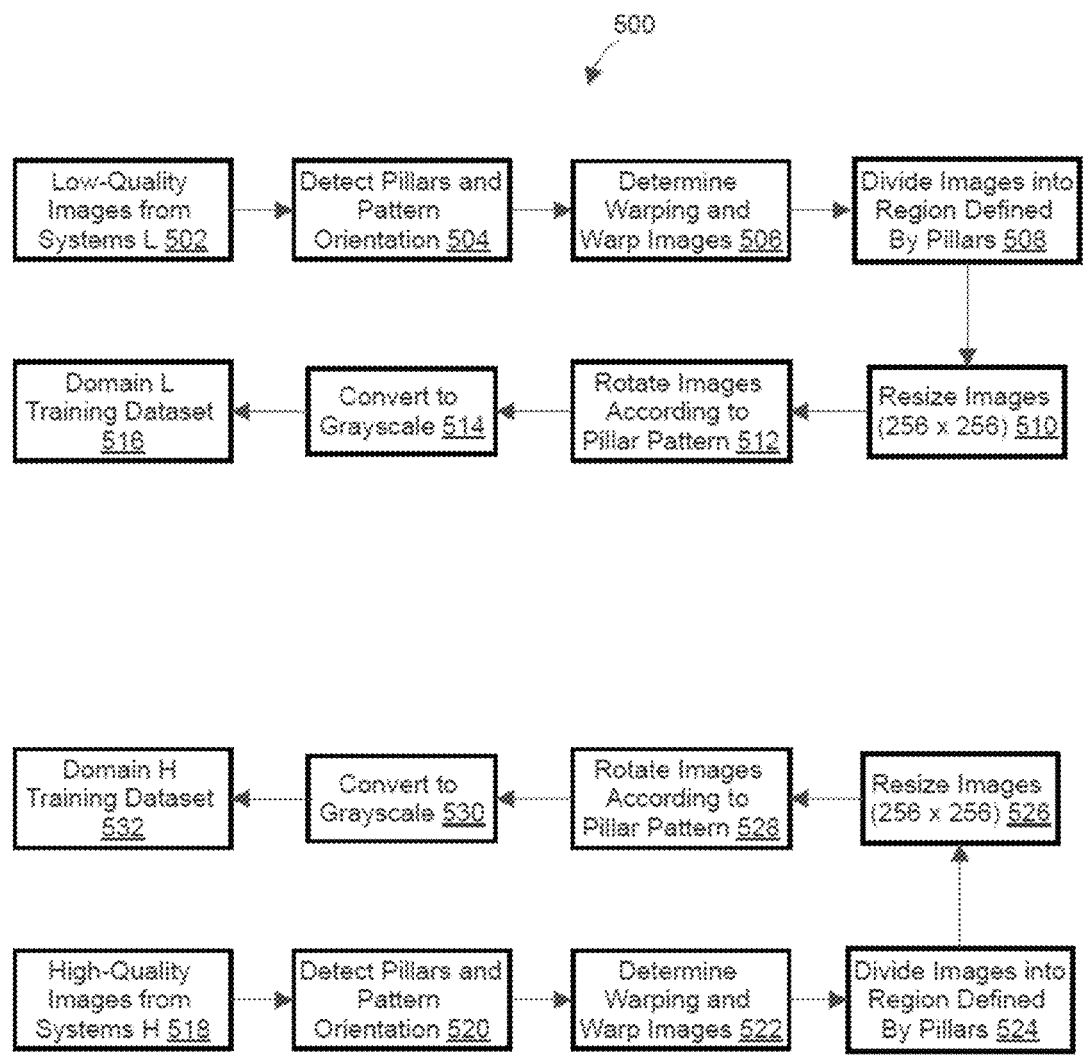
FIG. 8 depicts a flow diagram of a method for preparing a training dataset for a machine learning model according to an embodiment of the disclosure.

Instead of applying a spatial transform each region of an assay image captured by System L, some embodiments may apply a global spatial transform to the whole image in preparing the training dataset. FIG. 8 depicts a flow diagram of a method 500 for preparing a training dataset for a machine learning model according to an embodiment of the disclosure.

At 502, the processing devices may receive a low-quality assay image captured by an imaging system of a system L of a sample holder device containing a sample and a standard of patterned pillars.

At 504, the processing devices may detect pillar locations in the low-quality assay image, and optionally, detect the orientation of the pattern of the pillar locations. A machine learning model as discussed above may be used to detect pillar locations in the low-quality assay image. The orientation of the pattern may be detected based on the horizontal inter-pillar distance, the vertical inter-pillar distance, the count of pillars in the horizontal direction, and/or the count of pillars in the vertical direction.

At 506, the processing devices may determine a global spatial transform based on a mapping between the pillar locations in the low-quality assay image and the pillar positions in the true dimension space of the sample holder device. The processing devices may optionally perform other pre-processing operations such as estimating the field of view (FoV) based the pillar locations in the low-quality image and correcting the low-quality image based on the estimated FoV.

At 508, the processing devices may partition the low-quality image into regions, each of the regions being defined by four pillars at four corners.

At 510, the processing devices may optionally resize or scale each region to a common size (e.g., 256×256 pixels). This resize or rescale may prepare the data for the calculation using a later machine learning model.

At 512, the processing devices may rotate the low-quality images (and the regions therein) according to the orientation of the pattern of the pillars. This operation is to ensure that all images are compared in the same pattern orientation.

At 514, the processing devices may optionally convert each pixels to a greyscale pixel (e.g., from RGB color to greyscale). This operation may further reduce the calculation by the machine learning model.

At 516, the processing devices may store the such processed regions of low-quality images as domain L examples in the training dataset.

The high-quality assay images may be similarly processed.

At 518, the processing devices may receive a high-quality assay image captured by an imaging system of a system H of a sample holder device containing a sample and a standard of patterned pillars.

At 520, the processing devices may detect pillar locations in the high-quality assay image, and optionally, detect the orientation of the pattern of the pillar locations. A machine learning model as discussed above may be used to detect pillar locations in the high-quality assay image. The orientation of the pattern may be detected based on the horizontal inter-pillar distance, the vertical inter-pillar distance, the count of pillars in the horizontal direction, and/or the count of pillars in the vertical direction.

At 522, the processing devices may determine a global spatial transform based on a mapping between the pillar locations in the high-quality assay image and the pillar positions in the true dimension space of the sample holder device. The processing devices may optionally perform other pre-processing operations such as estimating the field of view (FoV) based the pillar locations in the high-quality image and correcting the high-quality image based on the estimated FoV.

At 524, the processing devices may partition the high-quality image into regions, each of the regions being defined by four pillars at four corners.

At 526, the processing devices may optionally resize or scale each region to a common size (e.g., 256×256 pixels). This resize or rescale may prepare the data for the calculation using a later machine learning model.

At 528, the processing devices may rotate the high-quality images (and the regions therein) according to the orientation of the pattern of the pillars. This operation is to ensure that all images are compared in the same pattern orientation.

At 530, the processing devices may optionally convert each pixels to a greyscale pixel (e.g., from RGB color to greyscale). This operation may further reduce the calculation by the machine learning model.

At 532, the processing devices may store the such processed regions of high-quality images as domain H examples in the training dataset. Thus, the training dataset may be constructed.

While embodiments of the disclosure are described in the context of image-based assaying using a sample holder device fabricated with a standard of patterned structural elements as landmark references in the assay images, the system and method of machine learning are readily applicable to other types of material imaging where the material being imaged may be morphed from a state of well-defined shape (e.g., crystal) to an amorphous state, and the imaging system used to capture the image of the amorphous material is imperfect. In some implementations, a machine learning model may be trained to learn the mapping from the material image of an amorphous material captured by an imperfect imaging system to the material image of a crystalline material captured by a perfect imaging system. However, such a direct training of the machine learning model requires a huge amount of training examples (e.g., in the order 10,000 or more), which is impractical due to the high cost.

FIG. 10A illustrates the mapping between a crystalline structure 702 and an amorphous structure 704. A crystalline structure 702 represents a material structure that has a certain pattern (e.g., periodic atom arrangement). In contrast, an amorphous structure 704 represents a material structure that has no pattern. In a traditional test paradigm (e.g., precision protocol paradigm (PPP)), the image of the crystalline structure 702 may be captured by a high precision instrument (e.g., an electronic microscope) by a professional human operator while the crystalline structure 702 is in perfect shape. In an intelligent test paradigm, the image of the amorphous structure 704 may be captured by an imprecise instrument (e.g., an imaging system of a smart phone) by a non-professional human operator. It is an objective of the intelligent test paradigm to map the amorphous structure 704 to the crystalline structure 702 using a machine learning model. As discussed above, the training of the machine learning model requires a huge amount of training data which are not readily available. Additionally, the direct mapping from the amorphous structure 704 to the crystalline structure 702 using such trained machine learning model may result in machine learning artifacts in the material image. Therefore, there is a need to reduce to the requirement for a large amount of training data and to improve the image fidelity.

Instead of trying to train a machine learning model that maps directly from the amorphous structure 704 to the crystalline structure 702, embodiments of the disclosure may introduce an intermediate structure to the crystalline structure and the amorphous structure during the construction of the training data. The machine learning model may be trained using the intermediate structure, thus reducing the requirement for training data and improving the image fidelity. FIG. 10B illustrates the mapping between a crystalline structure 704 injected with a meta structure and an amorphous structure 706 injected with the meta structure according to an embodiment of the disclosure. Meta structure may include elements with prominent physical characteristics (such as shapes and optical properties) that can easily distinguish these elements from the carrier crystalline/amorphous structures in a material image. Thus, when the training data contain material images of the crystalline structures 704 injected with the meta structure and material images of the amorphous structure 706 injected with the meta structure, the meta structure can be extracted first from these material images and can be used as training data to train the machine learning model. Because the physical properties and characteristics of the meta structure are known in advance, the meta structure can be extracted with confidence from the material images captured in the intelligent test paradigm using imprecise imaging systems by non-professional operators. Also because of the known physical properties and characteristics, the training of the machine learning model may require less training data and result in high-fidelity images.

Embodiments of the disclosure may include a method for training a machine learning model that maps of images of a first material of a first structure to images of a second material of a second structure. The method includes injecting a meta structure into the first material and capturing a first image of the first material using a first imaging system, injecting the meta structure into the second material and capturing a second image using a second imaging system, extracting first positions of the meta structure from the first image, extracting second positions of the meta structure from the second image, and training a machine learning model using the first positions and the second positions. The first material includes an amorphous structure, and the second material includes a crystalline structure. The method further includes applying the trained machine learning model to map an image of a third material having the first structure to an image of a fourth material having the second structure.

The sample holder devices as described in this disclosure can be a QMAX card. Technical details are described in International Application No. PCT/US2016/046437. A QMAX card may include two plates.

I. Plates

In present disclosure, generally, the plates of Compressed Regulated Open Flow (CROF) are made of any material that (i) is capable of being used to regulate, together with the spacers, the thickness of a portion or entire volume of the sample, and (ii) has no significant adverse effects to a sample, an assay, or a goal that the plates intend to accomplish. However, in certain embodiments, particular materials (hence their properties) ae used for the plate to achieve certain objectives.

In certain embodiments, the two plates have the same or different parameters for each of the following parameters: plate material, plate thickness, plate shape, plate area, plate flexibility, plate surface property, and plate optical transparency.

(i) Plate Materials. The plates are made a single material, composite materials, multiple materials, multilayer of materials, alloys, or a combination thereof. Each of the materials for the plate is an inorganic material, am organic material, or a mix, wherein examples of the materials are given in paragraphs of Mat-1 and Mat-2.

Mat-1: The inorganic materials for the plates include, not limited to, glass, quartz, oxides, silicon-dioxide, silicon-nitride, hafnium oxide (HfO), aluminum oxide (AlO), semiconductors: (silicon, GaAs, GaN, etc.), metals (e.g. gold, silver, coper, aluminum, Ti, Ni, etc.), ceramics, or any combinations of thereof.

Mat-2: The organic materials for the spacers include, not limited to, polymers (e.g. plastics) or amorphous organic materials. The polymer materials for the spacers include, not limited to, acrylate polymers, vinyl polymers, olefin polymers, cellulosic polymers, noncellulosic polymers, polyester polymers, Nylon, cyclic olefin copolymer (COC), poly (methyl methacrylate) (PMMA), polycarbonate (PC), cyclic olefin polymer (COP), liquid crystalline polymer (LCP), polyamide (PA), polyethylene (PE), polyimide (PI), polypropylene (PP), poly(phenylene ether) (PPE), polystyrene (PS), polyoxymethylene (POM), polyether ether ketone (PEEK), polyether sulfone (PES), poly(ethylene phthalate) (PET), polytetrafluoroethylene (PTFE), polyvinyl chloride (PVC), polyvinylidene fluoride (PVDF), polybutylene terephthalate (PBT), fluorinated ethylene propylene (FEP), perfluoroalkoxyalkane (PFA), polydimethylsiloxane (PDMS), rubbers, or any combinations of thereof.

In certain embodiments, the plates are each independently made of at least one of glass, plastic, ceramic, and metal. In certain embodiments, each plate independently includes at least one of glass, plastic, ceramic, and metal.

In certain embodiments, one plate is different from the other plate in lateral area, thickness, shape, materials, or surface treatment. In certain embodiments, one plate is the same as the other plate in lateral area, thickness, shape, materials, or surface treatment.

The materials for the plates are rigid, flexible or any flexibility between the two. The rigid (e.g. stiff) or flexibility is relative to a give pressing forces used in bringing the plates into the closed configuration.

In certain embodiments, a selection of rigid or flexible plate are determined from the requirements of controlling a uniformity of the sample thickness at the closed configuration.

In certain embodiments, at least one of the two plates are transparent (to a light). In certain embodiments at least a part or several parts of one plate or both plates are transparent. In certain embodiments, the plates are non-transparent.

(ii) Plate Thickness. In certain embodiments, the average thicknesses for at least one of the pates are 2 nm or less, 10 nm or less, 100 nm or less, 500 nm or less, 1000 nm or less, 2 um (micron) or less, 5 um or less, 10 um or less, 20 um or less, 50 um or less, 100 um or less, 150 um or less, 200 um or less, 300 um or less, 500 um or less, 800 um or less, 1 mm (millimeter) or less, 2 mm or less, 3 mm or less, or a range between any two of the values.

In certain embodiments, the average thicknesses for at least one of the plates are at most 3 mm (millimeter), at most 5 mm, at most 10 mm, at most 20 mm, at most 50 mm, at most 100 mm, at most 500 mm, or a range between any two of the values.

In certain embodiments, the thickness of a plate is not uniform across the plate. Using a different plate thickness at different location can be used to control the plate bending, folding, sample thickness regulation, and others.

(iii) Plate Shape and Area. Generally, the plates can have any shapes, as long as the shape allows a compress open flow of the sample and the regulation of the sample thickness. However, in certain embodiments, a particular shape can be advantageous. The shape of the plate can be round, elliptical, rectangles, triangles, polygons, ring-shaped, or any superpositions of these shapes.

In certain embodiments, the two plates can have the same size or shape, or different. The area of the plates depend on the application. The area of the plate is at most 1 mm2 (millimeter square), at most 10 mm2, at most 100 mm2, at most 1 cm2 (centimeter square), at most 5 cm2, at most 10 cm2, at most 100 cm2, at most 500 cm2, at most 1000 cm2, at most 5000 cm2, at most 10,000 cm2, or over 10,000 cm2, or any arrange between any of the two values. The shape of the plate can be rectangle, square, round, or others.

In certain embodiments, at least one of the plates is in the form of a belt (or strip) that has a width, thickness, and length. The width is at most 0.1 cm (centimeter), at most 0.5 cm, at most 1 cm, at most 5 cm, at most 10 cm, at most 50 cm, at most 100 cm, at most 500 cm, at most 1000 cm, or a range between any two of the values. The length can be as long it needed. The belt can be rolled into a roll.

(iv) Plate Surface Flatness. In many embodiments, an inner surface of the plates are flat or significantly flat, planar. In certain embodiments, the two inner surfaces are, at the closed configuration, parallel with each other. Flat inner surfaces facilitates a quantification and/or controlling of the sample thickness by simply using the predetermined spacer height at the closed configuration. For non-flat inner surfaces of the plate, one need to know not only the spacer height, but also the exact the topology of the inner surface to quantify and/or control the sample thickness at the closed configuration. To know the surface topology needs additional measurements and/or corrections, which can be complex, time consuming, and costly.

A flatness of the plate surface is relative to the final sample thickness (the final thickness is the thickness at the closed configuration), and is often characterized by the term of "relative surface flatness" is the ratio of the plate surface flatness variation to the final sample thickness.

In certain embodiments, the relative surface is less than 0.01%, 0.1%, less than 0.5%, less than 1%, less than 2%, less than 5%, less than 10%, less than 20%, less than 30%, less than 50%, less than 70%, less than 80%, less than 100%, or a range between any two of these values.

(v) Plate Surface Parallelness. In certain embodiments, the two surfaces of the plate is significantly parallel with each other. In certain embodiments, the two surfaces of the plate is not parallel with each other.

(vi) Plate Flexibility. In certain embodiments, a plate is flexible under the compressing of a CROF process. In certain embodiments, both plates are flexible under the compressing of a CROF process. In certain embodiments, a plate is rigid and another plate is flexible under the compressing of a CROF process. In certain embodiments, both plates are rigid. In certain embodiments, both plate are flexible but have different flexibility.

(vii) Plate Optical Transparency. In certain embodiments, a plate is optical transparent. In certain embodiments, both plates are optical transparent. In certain embodiments, a plate is optical transparent and another plate is opaque. In certain embodiments, both plates are opaque. In certain embodiments, both plate are optical transparent but have different optical transparency. The optical transparency of a plate can refer to a part or the entire area of the plate.

(viii) Surface Wetting Properties. In certain embodiments, a plate has an inner surface that wets (e.g. contact angle is less 90 degree) the sample, the transfer liquid, or both. In certain embodiments, both plates have an inner surface that wets the sample, the transfer liquid, or both; either with the same or different wettability. In certain embodiments, a plate has an inner surface that wets the sample, the transfer liquid, or both; and another plate has an inner surface that does not wet (e.g. the contact angle equal to or larger than 90 degree). The wetting of a plate inner surface can refer to a part or the entire area of the plate.

In certain embodiments, the inner surface of the plate has other nano or microstructures to control a lateral flow of a sample during a CROF. The nano or microstructures include, but not limited to, channels, pumps, and others. Nano and microstructures are also used to control the wetting properties of an inner surface.

II. Spacers (i) Spacers' Function. In present invention, the spacers are configured to have one or any combinations of the following functions and properties: the spacers are configured to (1) control, together with the plates, the thickness of the sample or a relevant volume of the sample (Preferably, the thickness control is precise, or uniform or both, over a relevant area); (2) allow the sample to have a compressed regulated open flow (CROF) on plate surface; (3) not take significant surface area (volume) in a given sample area (volume); (4) reduce or increase the effect of sedimentation of particles or analytes in the sample; (5) change and/or control the wetting propertied of the inner surface of the plates; (6) identify a location of the plate, a scale of size, and/or the information related to a plate, or (7) do any combination of the above.

(ii) Spacer Architectures and Shapes. To achieve desired sample thickness reduction and control, in certain embodiments, the spacers are fixed its respective plate. In general, the spacer can have any shape, as long as the spacers are capable of regulating the sample thickness during a CROF process, but certain shapes are preferred to achieve certain functions, such as better uniformity, less overshoot in pressing, etc.

The spacer(s) is a single spacer or a plurality of spacers. (e.g. an array). Certain embodiments of a plurality of spacers is an array of spacers (e.g. pillars), where the inter-spacer distance is periodic or aperiodic, or is periodic or aperiodic in certain areas of the plates, or has different distances in different areas of the plates.

There are two kinds of the spacers: open-spacers and enclosed-spacers. The open-spacer is the spacer that allows a sample to flow through the spacer (e.g. the sample flows around and pass the spacer. For example, a post as the spacer.), and the enclosed spacer is the spacer that stop the sample flow (e.g. the sample cannot flow beyond the spacer. For example, a ring shape spacer and the sample is inside the ring.). Both types of spacers use their height to regular the final sample thickness at a closed configuration.

In certain embodiments, the spacers are open-spacers only. In certain embodiments, the spacers are enclosed-spacers only. In certain embodiments, the spacers are a combination of open-spacers and enclosed-spacers.

The term "pillar spacer" means that the spacer has a pillar shape and the pillar shape can refer to an object that has height and a lateral shape that allow a sample to flow around it during a compressed open flow.

In certain embodiments, the lateral shapes of the pillar spacers are the shape selected from the groups of (i) round, elliptical, rectangles, triangles, polygons, ring-shaped, star-shaped, letter-shaped (e.g. L-shaped, C-shaped, the letters from A to Z), number shaped (e.g. the shapes like 0 1, 2, 3, 4, . . . to 9); (ii) the shapes in group (i) with at least one rounded corners; (iii) the shape from group (i) with zig-zag or rough edges; and (iv) any superposition of (i), (ii) and (iii). For multiple spacers, different spacers can have different lateral shape and size and different distance from the neighboring spacers.

In certain embodiments, the spacers can be and/or can include posts, columns, beads, spheres, and/or other suitable geometries. The lateral shape and dimension (e.g., transverse to the respective plate surface) of the spacers can be anything, except, in certain embodiments, the following restrictions: (i) the spacer geometry will not cause a significant error in measuring the sample thickness and volume; or (ii) the spacer geometry would not prevent the out-flowing of the sample between the plates (e.g. it is not in enclosed form). But in certain embodiments, they require some spacers to be closed spacers to restrict the sample flow.

In certain embodiments, the shapes of the spacers have rounded corners. For example, a rectangle shaped spacer has one, several or all corners rounded (like a circle rather 90 degree angle). A round corner often make a fabrication of the spacer easier, and in some cases less damage to a biological material.

The sidewall of the pillars can be straight, curved, sloped, or different shaped in different section of the sidewall. In certain embodiments, the spacers are pillars of various lateral shapes, sidewalls, and pillar-height to pillar lateral area ratio. In a preferred embodiment, the spacers have shapes of pillars for allowing open flow.

(iii) Spacers' Materials. In the present invention, the spacers are generally made of any material that is capable of being used to regulate, together with the two plates, the thickness of a relevant volume of the sample. In certain embodiments, the materials for the spacers are different from that for the plates. In certain embodiments, the materials for the spaces are at least the same as a part of the materials for at least one plate.

The spacers are made a single material, composite materials, multiple materials, multilayer of materials, alloys, or a combination thereof. Each of the materials for the spacers is an inorganic material, am organic material, or a mix, wherein examples of the materials are given in paragraphs of Mat-1 and Mat-2. In a preferred embodiment, the spacers are made in the same material as a plate used in CROF.

(iv) Spacers' Mechanical Strength and Flexibility. In certain embodiments, the mechanical strength of the spacers are strong enough, so that during the compression and at the closed configuration of the plates, the height of the spacers is the same or significantly same as that when the plates are in an open configuration. In certain embodiments, the differences of the spacers between the open configuration and the closed configuration can be characterized and predetermined.

The material for the spacers is rigid, flexible or any flexibility between the two. The rigid is relative to a give pressing forces used in bringing the plates into the closed configuration: if the space does not deform greater than 1% in its height under the pressing force, the spacer material is regarded as rigid, otherwise a flexible. When a spacer is made of material flexible, the final sample thickness at a closed configuration still can be predetermined from the pressing force and the mechanical property of the spacer.

(v) Spacers Inside Sample. To achieve desired sample thickness reduction and control, particularly to achieve a good sample thickness uniformity, in certain embodiments, the spacers are placed inside the sample, or the relevant volume of the sample. In certain embodiments, there are one or more spacers inside the sample or the relevant volume of the sample, with a proper inter spacer distance. In certain embodiments, at least one of the spacers is inside the sample, at least two of the spacers inside the sample or the relevant volume of the sample, or at least of "n" spacers inside the sample or the relevant volume of the sample, where "n" can be determined by a sample thickness uniformity or a required sample flow property during a CROF.

(vi) Spacer Height. In certain embodiments, all spacers have the same pre-determined height. In certain embodiments, spacers have different pre-determined height. In certain embodiments, spacers can be divided into groups or regions, wherein each group or region has its own spacer height. And in certain embodiments, the predetermined height of the spacers is an average height of the spacers. In certain embodiments, the spacers have approximately the same height. In certain embodiments, a percentage of number of the spacers have the same height.

The height of the spacers is selected by a desired regulated final sample thickness and the residue sample thickness. The spacer height (the predetermined spacer height) and/or sample thickness is 3 nm or less, 10 nm or less, 50 nm or less, 100 nm or less, 200 nm or less, 500 nm or less, 800 nm or less, 1000 nm or less, 1 um or less, 2 um or less, 3 um or less, 5 um or less, 10 um or less, 20 um or less, 30 um or less, 50 um or less, 100 um or less, 150 um or less, 200 um or less, 300 um or less, 500 um or less, 800 um or less, 1 mm or less, 2 mm or less, 4 mm or less, or a range between any two of the values.

The spacer height and/or sample thickness is between 1 nm to 100 nm in one preferred embodiment, 100 nm to 500 nm in another preferred embodiment, 500 nm to 1000 nm in a separate preferred embodiment, 1 um (e.g. 1000 nm) to 2 um in another preferred embodiment, 2 um to 3 um in a separate preferred embodiment, 3 um to 5 um in another preferred embodiment, 5 um to 10 um in a separate preferred embodiment, and 10 um to 50 um in another preferred embodiment, 50 um to 100 um in a separate preferred embodiment.

In certain embodiments, the spacer height and/or sample thickness (i) equal to or slightly larger than the minimum dimension of an analyte, or (ii) equal to or slightly larger than the maximum dimension of an analyte. The "slightly larger" means that it is about 1% to 5% larger and any number between the two values.

In certain embodiments, the spacer height and/or sample thickness is larger than the minimum dimension of an analyte (e.g. an analyte has an anisotropic shape), but less than the maximum dimension of the analyte.

For example, the red blood cell has a disk shape with a minim dimension of 2 um (disk thickness) and a maximum dimension of 11 um (a disk diameter). In an embodiment of the present invention, the spacers is selected to make the inner surface spacing of the plates in a relevant area to be 2 um (equal to the minimum dimension) in one embodiment, 2.2 um in another embodiment, or 3 (50% larger than the minimum dimension) in other embodiment, but less than the maximum dimension of the red blood cell. Such embodiment has certain advantages in blood cell counting. In one embodiment, for red blood cell counting, by making the inner surface spacing at 2 or 3 um and any number between the two values, a undiluted whole blood sample is confined in the spacing, on average, each red blood cell (RBC) does not overlap with others, allowing an accurate counting of the red blood cells visually. (Too many overlaps between the RBC's can cause serious errors in counting).

In the present invention, in certain embodiments, it uses the plates and the spacers to regulate not only a thickness of a sample, but also the orientation and/or surface density of the analytes/entity in the sample when the plates are at the closed configuration. When the plates are at a closed configuration, a thinner thickness of the sample gives a less the analytes/entity per surface area (e.g. less surface concentration).

(vii) Spacer Lateral Dimension. For an open-spacer, the lateral dimensions can be characterized by its lateral dimension (sometime being called width) in the x and y—two orthogonal directions. The lateral dimension of a spacer in each direction is the same or different.

In certain embodiments, the ratio of the lateral dimensions of x to y direction is 1, 1.5, 2, 5, 10, 100, 500, 1000, 10,000, or a range between any two of the value. In certain embodiments, a different ratio is used to regulate the sample flow direction; the larger the ratio, the flow is along one direction (larger size direction).

In certain embodiments, the different lateral dimensions of the spacers in x and y direction are used as (a) using the spacers as scale-markers to indicate the orientation of the plates, (b) using the spacers to create more sample flow in a preferred direction, or both.

In a preferred embodiment, the period, width, and height.

In certain embodiments, all spacers have the same shape and dimensions. In certain embodiments, each of the spacers have different lateral dimensions.

For enclosed-spacers, in certain embodiments, the inner lateral shape and size are selected based on the total volume of a sample to be enclosed by the enclosed spacer(s), wherein the volume size has been described in the present disclosure; and in certain embodiments, the outer lateral shape and size are selected based on the needed strength to support the pressure of the liquid against the spacer and the compress pressure that presses the plates.

(viii) Aspect Ratio of Height to the Average Lateral Dimension of Pillar Spacer. In certain embodiments, the aspect ratio of the height to the average lateral dimension of the pillar spacer is 100,000, 10,000, 1,000, 100, 10, 1, 0.1, 0.01, 0.001, 0.0001, 0, 00001, or a range between any two of the values.

(ix) Spacer Height Precisions. The spacer height should be controlled precisely. The relative precision of the spacer (e.g. the ratio of the deviation to the desired spacer height) is 0.001% or less, 0.01% or less, 0.1% or less; 0.5% or less, 1% or less, 2% or less, 5% or less, 8% or less, 10% or less, 15% or less, 20% or less, 30% or less, 40% or less, 50% or less, 60% or less, 70% or less, 80% or less, 90% or less, 99.9% or less, or a range between any of the values.

(x) Inter-Spacer Distance. The spacers can be a single spacer or a plurality of spacers on the plate or in a relevant area of the sample. In certain embodiments, the spacers on the plates are configured and/or arranged in an array form, and the array is a periodic, non-periodic array or periodic in some locations of the plate while non-periodic in other locations.

In certain embodiments, the periodic array of the spacers has a lattice of square, rectangle, triangle, hexagon, polygon, or any combinations of thereof, where a combination means that different locations of a plate has different spacer lattices.

In certain embodiments, the inter-spacer distance of a spacer array is periodic (e.g. uniform inter-spacer distance) in at least one direction of the array. In certain embodiments, the inter-spacer distance is configured to improve the uniformity between the plate spacing at a closed configuration.

The distance between neighboring spacers (e.g. the inter-spacer distance) is 1 um or less, 5 um or less, 10 um or less, 20 um or less, 30 um or less, 40 um or less, 50 um or less, 60 um or less, 70 um or less, 80 um or less, 90 um or less, 100 um or less, 200 um or less, 300 um or less, 400 um or less, or a range between any two of the values.

In certain embodiments, the inter-spacer distance is at 400 or less, 500 or less, 1 mm or less, 2 mm or less, 3 mm or less, 5 mm or less, 7 mm or less, 10 mm or less, or any range between the values. In certain embodiments, the inter-spacer distance is a 10 mm or less, 20 mm or less, 30 mm or less, 50 mm or less, 70 mm or less, 100 mm or less, or any range between the values.

The distance between neighboring spacers (e.g. the inter-spacer distance) is selected so that for a given properties of the plates and a sample, at the closed-configuration of the plates, the sample thickness variation between two neighboring spacers is, in certain embodiments, at most 0.5%, 1%, 5%, 10%, 20%, 30%, 50%, 80%, or any range between the values; or in certain embodiments, at most 80%, 100%, 200%, 400%, or a range between any two of the values.

Clearly, for maintaining a given sample thickness variation between two neighboring spacers, when a more flexible plate is used, a closer inter-spacer distance is needed.

Specify the accuracy of the inter spacer distance.

In a preferred embodiment, the spacer is a periodic square array, wherein the spacer is a pillar that has a height of 2 to 4 um, an average lateral dimension of from 5 to 20 um, and inter-spacer spacing of 1 um to 100 um.

In a preferred embodiment, the spacer is a periodic square array, wherein the spacer is a pillar that has a height of 2 to 4 um, an average lateral dimension of from 5 to 20 um, and inter-spacer spacing of 100 um to 250 um.

In a preferred embodiment, the spacer is a periodic square array, wherein the spacer is a pillar that has a height of 4 to 50 um, an average lateral dimension of from 5 to 20 um, and inter-spacer spacing of 1 um to 100 um.

In a preferred embodiment, the spacer is a periodic square array, wherein the spacer is a pillar that has a height of 4 to 50 um, an average lateral dimension of from 5 to 20 um, and inter-spacer spacing of 100 um to 250 um.

The period of spacer array is between 1 nm to 100 nm in one preferred embodiment, 100 nm to 500 nm in another preferred embodiment, 500 nm to 1000 nm in a separate preferred embodiment, 1 um (e.g. 1000 nm) to 2 um in another preferred embodiment, 2 um to 3 um in a separate preferred embodiment, 3 um to 5 um in another preferred embodiment, 5 um to 10 um in a separate preferred embodiment, and 10 um to 50 um in another preferred embodiment, 50 um to 100 um in a separate preferred embodiment, 100 um to 175 um in a separate preferred embodiment, and 175 um to 300 um in a separate preferred embodiment.

(xi) Spacer Density. The spacers are arranged on the respective plates at a surface density of greater than one per $um^2$, greater than one per 10 $um^2$, greater than one per 100 $um^2$, greater than one per 500 $um^2$, greater than one per 1000 $um^2$, greater than one per 5000 $um^2$, greater than one per 0.01 $mm^2$, greater than one per 0.1 $mm^2$, greater than one per 1 $mm^2$, greater than one per 5 $mm^2$, greater than one per 10 $mm^2$, greater than one per 100 $mm^2$, greater than one per 1000 $mm^2$, greater than one per 10000 $mm^2$, or a range between any two of the values.

(3) the spacers are configured to not take significant surface area (volume) in a given sample area (volume);

(xii) Ratio of Spacer Volume to Sample Volume. In many embodiments, the ratio of the spacer volume (e.g. the volume of the spacer) to sample volume (e.g. the volume of the sample), and/or the ratio of the volume of the spacers that are inside of the relevant volume of the sample to the relevant volume of the sample are controlled for achieving certain advantages. The advantages include, but not limited to, the uniformity of the sample thickness control, the uniformity of analytes, the sample flow properties (e.g. flow speed, flow direction, etc.).

In certain embodiments, the ratio of the spacer volume r) to sample volume, and/or the ratio of the volume of the spacers that are inside of the relevant volume of the sample to the relevant volume of the sample is less than 100%, at most 99%, at most 70%, at most 50%, at most 30%, at most 10%, at most 5%, at most 3% at most 1%, at most 0.1%, at most 0.01%, at most 0.001%, or a range between any of the values.

(xiii) Spacers Fixed to Plates. The inter spacer distance and the orientation of the spacers, which play a key role in the present invention, are preferably maintained during the process of bringing the plates from an open configuration to the closed configuration, and/or are preferably predetermined before the process from an open configuration to a closed configuration.

In certain embodiments of the present disclosure, spacers are fixed on one of the plates before bring the plates to the closed configuration. The term "a spacer is fixed with its respective plate" means that the spacer is attached to a plate and the attachment is maintained during a use of the plate. An example of "a spacer is fixed with its respective plate" is that a spacer is monolithically made of one piece of material of the plate, and the position of the spacer relative to the plate surface does not change. An example of "a spacer is not fixed with its respective plate" is that a spacer is glued to a plate by an adhesive, but during a use of the plate, the adhesive cannot hold the spacer at its original location on the plate surface (e.g. the spacer moves away from its original position on the plate surface).

In certain embodiments, at least one of the spacers are fixed to its respective plate. In certain embodiments, at two spacers are fixed to its respective plates. In certain embodiments, a majority of the spacers are fixed with their respective plates. In certain embodiments, all of the spacers are fixed with their respective plates.

In certain embodiments, a spacer is fixed to a plate monolithically.

In certain embodiments, the spacers are fixed to its respective plate by one or any combination of the following methods and/or configurations: attached to, bonded to, fused to, imprinted, and etched.

The term "imprinted" means that a spacer and a plate are fixed monolithically by imprinting (e.g. embossing) a piece of a material to form the spacer on the plate surface. The material can be single layer of a material or multiple layers of the material.

The term "etched" means that a spacer and a plate are fixed monolithically by etching a piece of a material to form the spacer on the plate surface. The material can be single layer of a material or multiple layers of the material.

The term "fused to" means that a spacer and a plate are fixed monolithically by attaching a spacer and a plate together, the original materials for the spacer and the plate fused into each other, and there is clear material boundary between the two materials after the fusion.

The term "bonded to" means that a spacer and a plate are fixed monolithically by binding a spacer and a plate by adhesion.

The term "attached to" means that a spacer and a plate are connected together.

In certain embodiments, the spacers and the plate are made in the same materials. In other embodiment, the spacers and the plate are made from different materials. In other embodiment, the spacer and the plate are formed in one piece. In other embodiment, the spacer has one end fixed to its respective plate, while the end is open for accommodating different configurations of the two plates.

In other embodiment, each of the spacers independently is at least one of attached to, bonded to, fused to, imprinted in, and etched in the respective plate. The term "independently" means that one spacer is fixed with its respective plate by a same or a different method that is selected from the methods of attached to, bonded to, fused to, imprinted in, and etched in the respective plate.

In certain embodiments, at least a distance between two spacers is predetermined ("predetermined inter-spacer distance" means that the distance is known when a user uses the plates.).

In certain embodiments of all methods and devices described herein, there are additional spacers besides to the fixed spacers.

(xiv) Specific Sample Thickness. In present invention, it was observed that a larger plate holding force (e.g. the force that holds the two plates together) can be achieved by using a smaller plate spacing (for a given sample area), or a larger sample area (for a given plate-spacing), or both.

In certain embodiments, at least one of the plates is transparent in a region encompassing the relevant area, each plate has an inner surface configured to contact the sample in the closed configuration; the inner surfaces of the plates are substantially parallel with each other, in the closed configuration; the inner surfaces of the plates are substantially planar, except the locations that have the spacers; or any combination of thereof.

The spacers can be fabricated on a plate in a variety of ways, using lithography, etching, embossing (nanoimprint), depositions, lift-off, fusing, or a combination of thereof. In certain embodiments, the spacers are directly embossed or imprinted on the plates. In certain embodiments, the spacers imprinted into a material (e.g. plastics) that is deposited on the plates. In certain embodiments, the spacers are made by directly embossing a surface of a CROF plate. The nanoimprinting can be done by roll to roll technology using a roller imprinter, or roll to a planar nanoimprint. Such process has a great economic advantage and hence lowering the cost.

In certain embodiments, the spacers are deposited on the plates. The deposition can be evaporation, pasting, or a lift-off. In the pasting, the spacer is fabricated first on a carrier, then the spacer is transferred from the carrier to the plate. In the lift-off, a removable material is first deposited on the plate and holes are created in the material; the hole bottom expose the plate surface and then a spacer material is deposited into the hole and afterwards the removable material is removed, leaving only the spacers on the plate surface. In certain embodiments, the spacers deposited on the plate are fused with the plate. In certain embodiments, the spacer and the plates are fabricated in a single process. The single process includes imprinting (e.g. embossing, molding) or synthesis.

In certain embodiments, at least two of the spacers are fixed to the respective plate by different fabrication methods, and optionally wherein the different fabrication methods include at least one of being deposition, bonded, fuse, imprinted, and etched.

In certain embodiments, one or more of the spacers are fixed to the respective plate(s) is by a fabrication method of being bonded, being fused, being imprinted, or being etched, or any combination of thereof.

In certain embodiments, the fabrication methods for forming such monolithic spacers on the plate include a method of being bonded, being fused, being imprinted, or being etched, or any combination of thereof.

B) Adaptor

Details of the Adaptor are described in detail in a variety of publications including International Application No. PCT/US2018/017504.

The present invention that is described herein address this problem by providing a system comprising an optical adaptor and a smartphone. The optical adaptor device fits over a smartphone converting it into a microscope which can take both fluorescent and bright-field images of a sample. This system can be operated conveniently and reliably by a common person at any location. The optical adaptor takes advantage of the existing resources of the smartphone, including camera, light source, processor and display screen, which provides a low-cost solution let the user to do bright-field and fluorescent microscopy.

In this invention, the optical adaptor device comprises a holder frame fitting over the upper part of the smartphone and an optical box attached to the holder having sample receptacle slot and illumination optics. In some references (U.S. Pat. No. 2016/029091 and U.S. Pat. No. 2011/0292198), their optical adaptor design is a whole piece including both the clip-on mechanics parts to fit over the smartphone and the functional optics elements. This design has the problem that they need to redesign the whole-piece optical adaptor for each specific model of smartphone. But in this present invention, the optical adaptor is separated into a holder frame only for fitting a smartphone and a universal optical box containing all the functional parts. For the smartphones with different dimensions, as long as the relative positions of the camera and the light source are the same, only the holder frame need to be redesigned, which will save a lot of cost of design and manufacture.

The optical box of the optical adaptor comprises: a receptacle slot which receives and position the sample in a sample slide in the field of view and focal range of the smartphone camera; a bright-field illumination optics for capturing bright-field microscopy images of a sample; a fluorescent illumination optics for capturing fluorescent microscopy images of a sample; a lever to switch between bright-field illumination optics and fluorescent illumination optics by sliding inward and outward in the optical box.

The receptacle slot has a rubber door attached to it, which can fully cover the slot to prevent the ambient light getting into the optical box to be collected by the camera. In U.S. Pat. 2016/0290916, the sample slot is always exposed to the ambient light which won't cause too much problem because it only does bright-field microscopy. But the present invention can take the advantage of this rubber door when doing fluorescent microscopy because the ambient light would bring a lot of noise to the image sensor of the camera.

To capture good fluorescent microscopy image, it is desirable that nearly no excitation light goes into the camera and only the fluorescent emitted by the sample is collected by the camera. For all common smartphones, however, the optical filter putting in front of the camera cannot block the undesired wavelength range of the light emitted from the light source of a smartphone very well due to the large divergence angle of the beams emitted by the light source and the optical filter not working well for un-collimated beams. Collimation optics can be designed to collimated the beam emitted by the smartphone light source to address this issue, but this approach increase the size and cost of the adaptor. Instead, in this present invention, fluorescent illumination optics enables the excitation light to illuminate the sample partially from the waveguide inside the sample slide and partially from the backside of the sample side in large oblique incidence angle so that excitation light will nearly not be collected by the camera to reduce the noise signal getting into the camera.

The bright-field illumination optics in the adaptor receive and turn the beam emitted by the light source so as to back-illuminated the sample in normal incidence angle.

Typically, the optical box also comprises a lens mounted in it aligned with the camera of the smartphone, which magnifies the images captured by the camera. The images captured by the camera can be further processed by the processor of smartphone and outputs the analysis result on the screen of smartphone.

To achieve both bright-field illumination and fluorescent illumination optics in a same optical adaptor, in this present invention, a slidable lever is used. The optical elements of the fluorescent illumination optics are mounted on the lever and when the lever fully slides into the optical box, the fluorescent illumination optics elements block the optical path of bright-field illumination optics and switch the illumination optics to fluorescent illumination optics. And when the lever slides out, the fluorescent illumination optics elements mounted on the lever move out of the optical path and switch the illumination optics to bright-field illumination optics. This lever design makes the optical adaptor work in both bright-field and fluorescent illumination modes without the need for designing two different single-mode optical boxes.

The lever comprises two planes at different planes at different heights.

In certain embodiments, two planes can be joined together with a vertical bar and move together in or out of the optical box. In certain embodiments, two planes can be separated and each plane can move individually in or out of the optical box.

The upper lever plane comprises at least one optical element which can be, but not limited to be an optical filter. The upper lever plane moves under the light source and the preferred distance between the upper lever plane and the light source is in the range of 0 to 5 mm.

Part of the bottom lever plane is not parallel to the image plane. And the surface of the non-parallel part of the bottom lever plane has mirror finish with high reflectivity larger than 95%. The non-parallel part of the bottom lever plane moves under the light source and deflects the light emitted from the light source to back-illuminate the sample area right under the camera. The preferred tilt angle of the non-parallel part of the bottom lever plane is in the range of 45 degree to 65 degree and the tilt angle is defined as the angle between the non-parallel bottom plane and the vertical plane.

Part of the bottom lever plane is parallel to the image plane and is located under and 1 mm to 10 mm away from the sample. The surface of the parallel part of the bottom lever plane is highly light absorptive with light absorption larger than 95%. This absorptive surface is to eliminate the reflective light back-illuminating on the sample in small incidence angle.

To slide in and out to switch the illumination optics using the lever, a stopper design comprising a ball plunger and a groove on the lever is used in order to stop the lever at a pre-defined position when being pulled outward from the adaptor. This allow the user to use arbitrary force the pull the lever but make the lever to stop at a fixed position where the optical adaptor's working mode is switched to bright-filed illumination.

A sample slider is mounted inside the receptacle slot to receive the QMAX device and position the sample in the QMAX device in the field of view and focal range of the smartphone camera.

The sample slider comprises a fixed track frame and a moveable arm:

The frame track is fixedly mounted in the receptacle slot of the optical box. And the track frame has a sliding track slot that fits the width and thickness of the QMAX device so that the QMAX device can slide along the track. The width and height of the track slot is carefully configured to make the QMAX device shift less than 0.5 mm in the direction perpendicular to the sliding direction in the sliding plane and shift less than less than 0.2 mm along the thickness direction of the QMAX device.

The frame track has an opened window under the field of view of the camera of smartphone to allow the light back-illuminate the sample.

A moveable arm is pre-built in the sliding track slot of the track frame and moves together with the QMAX device to guide the movement of QMAX device in the track frame.

The moveable arm equipped with a stopping mechanism with two pre-defined stop positions. For one position, the arm will make the QMAX device stop at the position where a fixed sample area on the QMAX device is right under the camera of smartphone. For the other position, the arm will make the QMAX device stop at the position where the sample area on QMAX device is out of the field of view of the smartphone and the QMAX device can be easily taken out of the track slot.

The moveable arm switches between the two stop positions by a pressing the QMAX device and the moveable arm together to the end of the track slot and then releasing.

The moveable arm can indicate if the QMAX device is inserted in correct direction. The shape of one corner of the QMAX device is configured to be different from the other three right angle corners. And the shape of the moveable arm matches the shape of the corner with the special shape so that only in correct direction can QMAX device slide to correct position in the track slot.

C) Smartphone/Detection System

Details of the Smartphone/Detection System are described in detail in a variety of publications including International Application (IA) No. PCT/US2016/046437 filed on Aug. 10, 2016, IA No. PCT/US2016/051775 filed Sep. 14, 2016, U.S. Provisional Application No. 62/456,065, which was filed on Feb. 7, 2017, U.S. Provisional Application Nos. 62/456,287 and 62/456,590, which were filed on Feb. 8, 2017, U.S. Provisional Application No. 62/456,504, which was filed on Feb. 8, 2017, U.S. Provisional Application No. 62/459,544, which was filed on Feb. 15, 2017, and U.S. Provisional Application Nos. 62/460,075 and 62/459,920, which were filed on Feb. 16, 2017.

The devices/apparatus, systems, and methods herein disclosed can include or use Q-cards for sample detection, analysis, and quantification. In certain embodiments, the Q-card is used together with an adaptor that can connect the Q-card with a smartphone detection system. In certain embodiments, the smartphone comprises a camera and/or an illumination source. In certain embodiments, the smartphone comprises a camera, which can be used to capture images or the sample when the sample is positioned in the field of view of the camera (e.g. by an adaptor). In certain embodiments, the camera includes one set of lenses (e.g. as in iPhone™ 6). In certain embodiments, the camera includes at least two sets of lenses (e.g. as in iPhone™ 7). In certain embodiments, the smartphone comprises a camera, but the camera is not used for image capturing.

In certain embodiments, the smartphone comprises a light source such as but not limited to LED (light emitting diode). In certain embodiments, the light source is used to provide illumination to the sample when the sample is positioned in the field of view of the camera (e.g. by an adaptor). In certain embodiments, the light from the light source is enhanced, magnified, altered, and/or optimized by optical components of the adaptor.

In certain embodiments, the smartphone comprises a processor that is configured to process the information from the sample. The smartphone includes software instructions that, when executed by the processor, can enhance, magnify, and/or optimize the signals (e.g. images) from the sample. The processor can include one or more hardware components, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In certain embodiments, the smartphone comprises a communication unit, which is configured and/or used to transmit data and/or images related to the sample to another device. Merely by way of example, the communication unit can use a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In certain embodiments, the smartphone is an iPhone™, an Android™ phone, or a Windows™ phone.

D). Method of Manufacture

Details of the Method of Manufacture are described in detail in a variety of publications including International Application No. PCT/US2018/057873 filed Oct. 26, 2018, which is hereby incorporated by reference herein for all purposes.

Devices of the disclosure can be fabricated using techniques well known in the art. The choice of fabrication technique will depend on the material used for the device and the size of the spacer array and/or the size of the spacers. Exemplary materials for fabricating the devices of the invention include glass, silicon, steel, nickel, polymers, e.g., poly(methylmethacrylate) (PMMA), polycarbonate, polystyrene, polyethylene, polyolefins, silicones (e.g., poly(dimethylsiloxane)), polypropylene, cis-polyisoprene (rubber), poly(vinyl chloride) (PVC), poly(vinyl acetate) (PVAc), polychloroprene (neoprene), polytetrafluoroethylene (Teflon), poly(vinylidene chloride) (SaranA), and cyclic olefin polymer (COP) and cyclic olefin copolymer (COC), and combinations thereof. Other materials are known in the art. For example, deep Reactive Ion Etch (DRIE) is used to fabricate silicon-based devices with small gaps, small spacers and large aspect ratios (ratio of spacer height to lateral dimension). Thermoforming (embossing, injection molding) of plastic devices can also be used, e.g., when the smallest lateral feature is >20 microns and the aspect ratio of these features is 10.

Additional methods include photolithography (e.g., stereolithography or x-ray photolithography), molding, embossing, silicon micromachining, wet or dry chemical etching, milling, diamond cutting, Lithographic Galvanoformung and Abformung (LIGA), and electroplating. For example, for glass, traditional silicon fabrication techniques of photolithography followed by wet (KOH) or dry etching (reactive ion etching with fluorine or other reactive gas) can be employed. Techniques such as laser micromachining can be adopted for plastic materials with high photon absorption efficiency. This technique is suitable for lower throughput fabrication because of the serial nature of the process. For mass-produced plastic devices, thermoplastic injection molding, and compression molding can be suitable. Conventional thermoplastic injection molding used for mass-fabrication of compact discs (which preserves fidelity of features in sub-microns) can also be employed to fabricate the devices of the invention. For example, the device features are replicated on a glass master by conventional photolithography. The glass master is electroformed to yield a tough, thermal shock resistant, thermally conductive, hard mold. This mold serves as the master template for injection molding or compression molding the features into a plastic device. Depending on the plastic material used to fabricate the devices and the requirements on optical quality and throughput of the finished product, compression molding or injection molding can be chosen as the method of manufacture. Compression molding (also called hot embossing or relief imprinting) has the advantages of being compatible with high molecular weight polymers, which are excellent for small structures and can replicate high aspect ratio structures but has longer cycle times. Injection molding works well for low aspect ratio structures and is most suitable for low molecular weight polymers.

A device can be fabricated in one or more pieces that are then assembled. Layers of a device can be bonded together by clamps, adhesives, heat, anodic bonding, or reactions between surface groups (e.g., wafer bonding). Alternatively, a device with channels or gaps in more than one plane can be fabricated as a single piece, e.g., using stereolithography or other three-dimensional fabrication techniques.

To reduce non-specific adsorption of cells or compounds released by lysed cells onto the surfaces of the device, one or more surfaces of the device can be chemically modified to be non-adherent or repulsive. The surfaces can be coated with a thin film coating (e.g., a monolayer) of commercial non-stick reagents, such as those used to form hydrogels. Additional examples chemical species that can be used to modify the surfaces of the device include oligoethylene glycols, fluorinated polymers, organosilanes, thiols, polyethylene glycol, hyaluronic acid, bovine serum albumin, poly-vinyl alcohol, mucin, poly-HEMA, methacrylated PEG, and agarose. Charged polymers can also be employed to repel oppositely charged species. The type of chemical species used for repulsion and the method of attachment to the surfaces of the device will depend on the nature of the species being repelled and the nature of the surfaces and the species being attached. Such surface modification techniques are well known in the art. The surfaces can be functionalized before or after the device is assembled. The surfaces of the device can also be coated in order to capture materials in the sample, e.g., membrane fragments or proteins.

In certain embodiments of the present disclosure, a method for fabricating any Q-Card of the present disclosure can comprise injection molding of the first plate. In certain embodiments of the present disclosure, a method for fabricating any Q-Card of the present disclosure can comprise nanoimprinting or extrusion printing of the second plate. In certain embodiments of the present disclosure, a method for fabricating any Q-Card of the present disclosure can comprise Laser cutting the first plate. In certain embodiments of the present disclosure, a method for fabricating any Q-Card of the present disclosure can comprise nanoimprinting or extrusion printing of the second plate. In certain embodiments of the present disclosure, a method for fabricating any Q-Card of the present disclosure can comprise injection molding and laser cutting the first plate. In certain embodiments of the present disclosure, a method for fabricating any Q-Card of the present disclosure can comprise nanoimprinting or extrusion printing of the second plate. In certain embodiments of the present disclosure, a method for fabricating any Q-Card of the present disclosure can comprise nanoimprinting or extrusion printing to fabricated both the first and the second plate. In certain embodiments of the present disclosure, a method for fabricating any Q-Card of the present disclosure can comprise fabricating the first plate or the second plate, using injection molding, laser cutting the first plate, nanoimprinting, extrusion printing, or a combination of thereof. In certain embodiments of the present disclosure, a method for fabricating any Q-Card of the present disclosure can comprise a step of attaching the hinge on the first and the second plates after the fabrication of the first and second plates.

E) Sample Types & Subjects

Details of the Samples & Subjects are described in detail in a variety of publications including International Application (IA) No. PCT/US2016/046437 filed on Aug. 10, 2016, IA No. PCT/US2016/051775 filed on Sep. 14, 2016, IA No. PCT/US201/017307 filed on Feb. 7, 2018, IA No. and PCT/US2017/065440 filed on Dec. 8, 2017.

A sample can be obtained from a subject. A subject as described herein can be of any age and can be an adult, infant or child. In some cases, the subject is 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 years old, or within a range therein (e.g., between 2 and 20 years old, between 20 and 40 years old, or between 40 and 90 years old). A particular class of subjects that can benefit is subjects who have or are suspected of having an infection (e.g., a bacterial and/or a viral infection). Another particular class of subjects that can benefit is subjects who can be at higher risk of getting an infection. Furthermore, a subject treated by any of the methods or compositions described herein can be male or female. Any of the methods, devices, or kits disclosed herein can also be performed on a non-human subject, such as a laboratory or farm animal. Non-limiting examples of a non-human subjects include a dog, a goat, a guinea pig, a hamster, a mouse, a pig, a non-human primate (e.g., a gorilla, an ape, an orangutan, a lemur, or a baboon), a rat, a sheep, a cow, or a zebrafish.

The devices, apparatus, systems, and methods herein disclosed can be used for samples such as but not limited to diagnostic samples, clinical samples, environmental samples and foodstuff samples.

For example, in certain embodiments, the devices, apparatus, systems, and methods herein disclosed are used for a sample that includes cells, tissues, bodily fluids and/or a mixture thereof. In certain embodiments, the sample comprises a human body fluid. In certain embodiments, the sample comprises at least one of cells, tissues, bodily fluids, stool, amniotic fluid, aqueous humour, vitreous humour, blood, whole blood, fractionated blood, plasma, serum, breast milk, cerebrospinal fluid, cerumen, chyle, chime, endolymph, perilymph, feces, gastric acid, gastric juice, lymph, mucus, nasal drainage, phlegm, pericardial fluid, peritoneal fluid, pleural fluid, pus, rheum, saliva, sebum, semen, sputum, sweat, synovial fluid, tears, vomit, urine, and exhaled breath condensate.

In certain embodiments, the devices, apparatus, systems, and methods herein disclosed are used for an environmental sample that is obtained from any suitable source, such as but not limited to: river, lake, pond, ocean, glaciers, icebergs, rain, snow, sewage, reservoirs, tap water, drinking water, etc.; solid samples from soil, compost, sand, rocks, concrete, wood, brick, sewage, etc.; and gaseous samples from the air, underwater heat vents, industrial exhaust, vehicular exhaust, etc. In certain embodiments, the environmental sample is fresh from the source; in certain embodiments, the environmental sample is processed. For example, samples that are not in liquid form are converted to liquid form before the subject devices, apparatus, systems, and methods are applied.

In certain embodiments, the devices, apparatus, systems, and methods herein disclosed are used for a foodstuff sample, which is suitable or has the potential to become suitable for animal consumption, e.g., human consumption. In certain embodiments, a foodstuff sample includes raw ingredients, cooked or processed food, plant and animal sources of food, preprocessed food as well as partially or fully processed food, etc. In certain embodiments, samples that are not in liquid form are converted to liquid form before the subject devices, apparatus, systems, and methods are applied.

The subject devices, apparatus, systems, and methods can be used to analyze any volume of the sample. Examples of the volumes include, but are not limited to, about 10 mL or less, 5 mL or less, 3 mL or less, 1 microliter (uL, also "uL" herein) or less, 500 uL or less, 300 uL or less, 250 uL or less, 200 uL or less, 170 uL or less, 150 uL or less, 125 uL or less, 100 uL or less, 75 uL or less, 50 uL or less, 25 uL or less, 20 uL or less, 15 uL or less, 10 uL or less, 5 uL or less, 3 uL or less, 1 uL or less, 0.5 uL or less, 0.1 uL or less, 0.05 uL or less, 0.001 uL or less, 0.0005 uL or less, 0.0001 uL or less, 10 pL or less, 1 pL or less, or a range between any two of the values.

In certain embodiments, the volume of the sample includes, but is not limited to, about 100 uL or less, 75 uL or less, 50 uL or less, 25 uL or less, 20 uL or less, 15 uL or less, 10 uL or less, 5 uL or less, 3 uL or less, 1 uL or less, 0.5 uL or less, 0.1 uL or less, 0.05 uL or less, 0.001 uL or less, 0.0005 uL or less, 0.0001 uL or less, 10 pL or less, 1 pL or less, or a range between any two of the values. In certain embodiments, the volume of the sample includes, but is not limited to, about 10 uL or less, 5 uL or less, 3 uL or less, 1 uL or less, 0.5 uL or less, 0.1 uL or less, 0.05 uL or less, 0.001 uL or less, 0.0005 uL or less, 0.0001 uL or less, 10 pL or less, 1 pL or less, or a range between any two of the values.

In certain embodiments, the amount of the sample is about a drop of liquid. In certain embodiments, the amount of sample is the amount collected from a pricked finger or fingerstick. In certain embodiments, the amount of sample is the amount collected from a microneedle, micropipette or a venous draw.

F) Machine Learning

Details of the Network are described in detail in a variety of publications including International Application (IA) No. PCT/US2018/017504 filed Feb. 8, 2018, and PCT/US2018/

057877 filed Oct. 26, 2018, each of which are hereby incorporated by reference herein for all purposes.

One aspect of the present invention provides a framework of machine learning and deep learning for analyte detection and localization. A machine learning algorithm is an algorithm that is able to learn from data. A more rigorous definition of machine learning is "A computer program is said to learn from experience E with respect to some class of tasks T and performance measure P, if its performance at tasks in T, as measured by P, improves with experience E." It explores the study and construction of algorithms that can learn from and make predictions on data—such algorithms overcome the static program instructions by making data driven predictions or decisions, through building a model from sample inputs.

Deep learning is a specific kind of machine learning based on a set of algorithms that attempt to model high level abstractions in data. In a simple case, there might be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

One aspect of the present invention is to provide two analyte detection and localization approaches. The first approach is a deep learning approach and the second approach is a combination of deep learning and computer vision approaches.

(i) Deep Learning Approach. In the first approach, the disclosed analyte detection and localization workflow consists of two stages, training and prediction. We describe training and prediction stages in the following paragraphs.

(a) Training Stage

In the training stage, training data with annotation is fed into a convolutional neural network. Convolutional neural network is a specialized neural network for processing data that has a grid-like, feed forward and layered network topology. Examples of the data include time-series data, which can be thought of as a 1D grid taking samples at regular time intervals, and image data, which can be thought of as a 2D grid of pixels. Convolutional networks have been successful in practical applications. The name "convolutional neural network" indicates that the network employs a mathematical operation called convolution. Convolution is a specialized kind of linear operation. Convolutional networks are simply neural networks that use convolution in place of general matrix multiplication in at least one of their layers.

The machine learning model receives one or multiple images of samples that contain the analytes taken by the imaging system over the sample holding QMAX device as training data. Training data are annotated for analytes to be assayed, wherein the annotations indicate whether or not analytes are in the training data and where they locate in the image. Annotation can be done in the form of tight bounding boxes which fully contains the analyte, or center locations of analytes. In the latter case, center locations are further converted into circles covering analytes or a Gaussian kernel in a point map.

When the size of training data is large, training machine learning model presents two challenges: annotation (usually done by human) is time consuming, and the training is computationally expensive. To overcome these challenges, one can partition the training data into patches of small size, then annotate and train on these patches, or a portion of these patches. The term "machine learning" can refer to algorithms, systems and apparatus in the field of artificial intelligence that often use statistical techniques and artificial neural network trained from data without being explicitly programmed The annotated images are fed to the machine learning (ML) training module, and the model trainer in the machine learning module will train a ML model from the training data (annotated sample images). The input data will be fed to the model trainer in multiple iterations until certain stopping criterion is satisfied. The output of the ML training module is a ML model—a computational model that is built from a training process in the machine learning from the data that gives computer the capability to perform certain tasks (e.g. detect and classify the objects) on its own.

The trained machine learning model is applied during the predication (or inference) stage by the computer. Examples of machine learning models include ResNet, DenseNet, etc. which are also named as "deep learning models" because of the depth of the connected layers in their network structure. In certain embodiments, the Caffe library with fully convolutional network (FCN) was used for model training and predication, and other convolutional neural network architecture and library can also be used, such as TensorFlow.

The training stage generates a model that will be used in the prediction stage. The model can be repeatedly used in the prediction stage for assaying the input. Thus, the computing unit only needs access to the generated model. It does not need access to the training data, nor requiring the training stage to be run again on the computing unit.

(b) Prediction Stage

In the predication/inference stage, a detection component is applied to the input image, and an input image is fed into the predication (inference) module preloaded with a trained model generated from the training stage. The output of the prediction stage can be bounding boxes that contain the detected analytes with their center locations or a point map indicating the location of each analyte, or a heatmap that contains the information of the detected analytes.

When the output of the prediction stage is a list of bounding boxes, the number of analytes in the image of the sample for assaying is characterized by the number of detected bounding boxes. When the output of the prediction stage is a point map, the number of analytes in the image of the sample for assaying is characterized by the integration of the point map. When the output of the prediction is a heatmap, a localization component is used to identify the location and the number of detected analytes is characterized by the entries of the heatmap.

One embodiment of the localization algorithm is to sort the heatmap values into a one-dimensional ordered list, from the highest value to the lowest value. Then pick the pixel with the highest value, remove the pixel from the list, along with its neighbors. Iterate the process to pick the pixel with the highest value in the list, until all pixels are removed from the list.

In the detection component using heatmap, an input image, along with the model generated from the training stage, is fed into a convolutional neural network, and the output of the detection stage is a pixel-level prediction, in the form of a heatmap. The heatmap can have the same size as the input image, or it can be a scaled down version of the input image, and it is the input to the localization component. We disclose an algorithm to localize the analyte center. The main idea is to iteratively detect local peaks from the heatmap. After the peak is localized, we calculate the local area surrounding the peak but with smaller value. We remove this region from the heatmap and find the next peak from the remaining pixels. The process is repeated only all pixels are removed from the heatmap.

In certain embodiments, the present invention provides the localization algorithm to sort the heatmap values into a one-dimensional ordered list, from the highest value to the lowest value. Then pick the pixel with the highest value, remove the pixel from the list, along with its neighbors. Iterate the process to pick the pixel with the highest value in the list, until all pixels are removed from the list.

```
Algorithm Global Search (heatmap)
Input:
    heatmap
Output:
    loci
loci ←{ }
sort(heatmap)
while (heatmap is not empty) {
    s ← pop(heatmap)
    D ← {disk center as s with radius R}
    heatmap = heatmap \ D  // remove D from the heatmap
    add s to loci
}
```

After sorting, heatmap is a one-dimensional ordered list, where the heatmap value is ordered from the highest to the lowest. Each heatmap value is associated with its corresponding pixel coordinates. The first item in the heatmap is the one with the highest value, which is the output of the pop(heatmap) function. One disk is created, where the center is the pixel coordinate of the one with highest heatmap value. Then all heatmap values whose pixel coordinates resides inside the disk is removed from the heatmap. The algorithm repeatedly pops up the highest value in the current heatmap, removes the disk around it, till the items are removed from the heatmap.

In the ordered list heatmap, each item has the knowledge of the proceeding item, and the following item. When removing an item from the ordered list, we make the following changes:

Assume the removing item is $x_r$, its proceeding item is $x_p$, and its following item is $x_f$.

For the proceeding item $x_p$, re-define its following item to the following item of the removing item. Thus, the following item of $x_p$ is now $x_f$.

For the removing item $x_r$, un-define its proceeding item and following item, which removes it from the ordered list.

For the following item $x_f$, re-define its proceeding item to the proceeding item of the removed item. Thus, the proceeding item of $x_f$ is now $x_p$.

After all items are removed from the ordered list, the localization algorithm is complete. The number of elements in the set loci will be the count of analytes, and location information is the pixel coordinate for each s in the set loci.

Another embodiment searches local peak, which is not necessary the one with the highest heatmap value. To detect each local peak, we start from a random starting point, and search for the local maximal value. After we find the peak, we calculate the local area surrounding the peak but with smaller value. We remove this region from the heatmap and find the next peak from the remaining pixels. The process is repeated only all pixels are removed from the heatmap.

```
Algorithm LocalSearch (s, heatmap)
Input:
    s: starting location (x, y)
    heatmap
Output:
    s: location of local peak.
We only consider pixels of value > 0.
Algorithm Cover (s, heatmap)
Input:
    s: location of local peak.
    heatmap:
Output:
    cover: a set of pixels covered by peak:
```

This is a breadth-first-search algorithm starting from s, with one altered condition of visiting points: a neighbor p of the current location q is only added to cover if heatmap[p]>0 and heatmap[p]<=heatmap[q]. Therefore, each pixel in cover has a non-descending path leading to the local peak s.

```
Algorithm Localization (heatmap)
Input:
    heatmap
Output:
    loci
loci ←{ }
pixels ←{all pixels from heatmap}
while pixels is not empty {
    s ←any pixel from pixels
    s ←LocalSearch(s, heatmap)   // s is now local peak
    probe local region of radius R surrounding s for better local peak
    r ←Cover(s, heatmap)
    pixels ← pixels \ r         // remove all pixels in cover
    add s to loci
```

(ii) Mixture of Deep Learning and Computer Vision Approaches. In the second approach, the detection and localization are realized by computer vision algorithms, and a classification is realized by deep learning algorithms, wherein the computer vision algorithms detect and locate possible candidates of analytes, and the deep learning algorithm classifies each possible candidate as a true analyte and false analyte. The location of all true analyte (along with the total count of true analytes) will be recorded as the output.

(a) Detection. The computer vision algorithm detects possible candidate based on the characteristics of analytes, including but not limited to intensity, color, size, shape, distribution, etc. A pre-processing scheme can improve the detection. Pre-processing schemes include contrast enhancement, histogram adjustment, color enhancement, de-nosing, smoothing, de-focus, etc. After pre-processing, the input image is sent to a detector. The detector tells the existing of possible candidate of analyte and gives an estimate of its location. The detection can be based on the analyte structure (such as edge detection, line detection, circle detection, etc.), the connectivity (such as blob detection, connect components, contour detection, etc.), intensity, color, shape using schemes such as adaptive thresholding, etc.

(b) Localization. After detection, the computer vision algorithm locates each possible candidate of analytes by providing its boundary or a tight bounding box containing it. This can be achieved through object segmentation algorithms, such as adaptive thresholding, background subtraction, floodfill, mean shift, watershed, etc. Very often, the localization can be combined with detection to produce the detection results along with the location of each possible candidates of analytes.

(c) Classification. The deep learning algorithms, such as convolutional neural networks, achieve start-of-the-art visual classification. We employ deep learning algorithms for classification on each possible candidate of analytes. Various convolutional neural network can be utilized for analyte classification, such as VGGNet, ResNet, MobileNet, DenseNet, etc.

Given each possible candidate of analyte, the deep learning algorithm computes through layers of neurons via convolution filters and non-linear filters to extract high-level features that differentiate analyte against non-analytes. A layer of fully convolutional network will combine high-level features into classification results, which tells whether it is a true analyte or not, or the probability of being a analyte.

G). Applications, Bio/Chemical Biomarkers, and Health Conditions

The applications of the present invention include, but not limited to, (a) the detection, purification and quantification of chemical compounds or biomolecules that correlates with the stage of certain diseases, e.g., infectious and parasitic disease, injuries, cardiovascular disease, cancer, mental disorders, neuropsychiatric disorders and organic diseases, e.g., pulmonary diseases, renal diseases, (b) the detection, purification and quantification of microorganism, e.g., virus, fungus and bacteria from environment, e.g., water, soil, or biological samples, e.g., tissues, bodily fluids, (c) the detection, quantification of chemical compounds or biological samples that pose hazard to food safety or national security, e.g. toxic waste, anthrax, (d) quantification of vital parameters in medical or physiological monitor, e.g., glucose, blood oxygen level, total blood count, (e) the detection and quantification of specific DNA or RNA from biosamples, e.g., cells, viruses, bodily fluids, (f) the sequencing and comparing of genetic sequences in DNA in the chromosomes and mitochondria for genome analysis or (g) to detect reaction products, e.g., during synthesis or purification of pharmaceuticals.

The detection can be carried out in various sample matrix, such as cells, tissues, bodily fluids, and stool. Bodily fluids of interest include but are not limited to, amniotic fluid, aqueous humour, vitreous humour, blood (e.g., whole blood, fractionated blood, plasma, serum, etc.), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine and exhaled condensate. In certain embodiments, the sample comprises a human body fluid. In certain embodiments, the sample comprises at least one of cells, tissues, bodily fluids, stool, amniotic fluid, aqueous humour, vitreous humour, blood, whole blood, fractionated blood, plasma, serum, breast milk, cerebrospinal fluid, cerumen, chyle, chime, endolymph, perilymph, feces, gastric acid, gastric juice, lymph, mucus, nasal drainage, phlegm, pericardial fluid, peritoneal fluid, pleural fluid, pus, rheum, saliva, sebum, semen, sputum, sweat, synovial fluid, tears, vomit, urine, and exhaled condensate.

In some embodiments, the sample is at least one of a biological sample, an environmental sample, and a biochemical sample.

The devices, systems and the methods in the present invention find use in a variety of different applications in various fields, where determination of the presence or absence, and/or quantification of one or more analytes in a sample are desired. For example, the subject method finds use in the detection of proteins, peptides, nucleic acids, synthetic compounds, inorganic compounds, and the like. The various fields include, but not limited to, human, veterinary, agriculture, foods, environments, drug testing, and others.

In certain embodiments, the subject method finds use in the detection of nucleic acids, proteins, or other biomolecules in a sample. The methods can include the detection of a set of biomarkers, e.g., two or more distinct protein or nucleic acid biomarkers, in a sample. For example, the methods can be used in the rapid, clinical detection of two or more disease biomarkers in a biological sample, e.g., as can be employed in the diagnosis of a disease condition in a subject, or in the ongoing management or treatment of a disease condition in a subject, etc. As described above, communication to a physician or other health-care provider can better ensure that the physician or other health-care provider is made aware of, and cognizant of, possible concerns and can thus be more likely to take appropriate action.

The applications of the devices, systems and methods in the present inventions of employing a CROF device include, but are not limited to, (a) the detection, purification and quantification of chemical compounds or biomolecules that correlates with the stage of certain diseases, e.g., infectious and parasitic disease, injuries, cardiovascular disease, cancer, mental disorders, neuropsychiatric disorders and organic diseases, e.g., pulmonary diseases, renal diseases, (b) the detection, purification and quantification of microorganism, e.g., virus, fungus and bacteria from environment, e.g., water, soil, or biological samples, e.g., tissues, bodily fluids, (c) the detection, quantification of chemical compounds or biological samples that pose hazard to food safety or national security, e.g. toxic waste, anthrax, (d) quantification of vital parameters in medical or physiological monitor, e.g., glucose, blood oxygen level, total blood count, (e) the detection and quantification of specific DNA or RNA from biosamples, e.g., cells, viruses, bodily fluids, (f) the sequencing and comparing of genetic sequences in DNA in the chromosomes and mitochondria for genome analysis or (g) to detect reaction products, e.g., during synthesis or purification of pharmaceuticals. Some of the specific applications of the devices, systems and methods in the present invention are described now in further detail.

The applications of the present invention include, but not limited to, (a) the detection, purification and quantification of chemical compounds or biomolecules that correlates with the stage of certain diseases, e.g., infectious and parasitic disease, injuries, cardiovascular disease, cancer, mental disorders, neuropsychiatric disorders and organic diseases, e.g., pulmonary diseases, renal diseases, (b) the detection, purification and quantification of microorganism, e.g., virus, fungus and bacteria from environment, e.g., water, soil, or biological samples, e.g., tissues, bodily fluids, (c) the detection, quantification of chemical compounds or biological samples that pose hazard to food safety or national security, e.g. toxic waste, anthrax, (d) quantification of vital parameters in medical or physiological monitor, e.g., glucose, blood oxygen level, total blood count, (e) the detection and quantification of specific DNA or RNA from biosamples, e.g., cells, viruses, bodily fluids, (f) the sequencing and comparing of genetic sequences in DNA in the chromosomes and mitochondria for genome analysis or (g) to detect reaction products, e.g., during synthesis or purification of pharmaceuticals.

An implementation of the devices, systems and methods in the present invention can include a) obtaining a sample, b) applying the sample to CROF device containing a capture agent that binds to an analyte of interest, under conditions suitable for binding of the analyte in a sample to the capture agent, c) washing the CROF device, and d) reading the CROF device, thereby obtaining a measurement of the amount of the analyte in the sample. In certain embodiments, the analyte can be a biomarker, an environmental marker, or a foodstuff marker. The sample in some instances is a liquid sample, and can be a diagnostic sample (such as saliva, serum, blood, sputum, urine, sweat, lacrima, semen, or mucus); an environmental sample obtained from a river, ocean, lake, rain, snow, sewage, sewage processing runoff, agricultural runoff, industrial runoff, tap water or drinking water; or a foodstuff sample obtained from tap water, drinking water, prepared food, processed food or raw food.

In any embodiment, the CROF device can be placed in a microfluidic device and the applying step b) can include applying a sample to a microfluidic device comprising the CROF device.

In any embodiment, the reading step d) can include detecting a fluorescence or luminescence signal from the CROF device.

In any embodiment, the reading step d) can include reading the CROF device with a handheld device configured to read the CROF device. The handheld device can be a mobile phone, e.g., a smart phone.

In any embodiment, the CROF device can include a labeling agent that can bind to an analyte-capture agent complex on the CROF device.

In any embodiment, the devices, systems and methods in the present invention can further include, between steps c) and d), the steps of applying to the CROF device a labeling agent that binds to an analyte-capture agent complex on the CROF device, and washing the CROF device.

In any embodiment, the reading step d) can include reading an identifier for the CROF device. The identifier can be an optical barcode, a radio frequency ID tag, or combinations thereof.

In any embodiment, the devices, systems and methods in the present invention can further include applying a control sample to a control CROF device containing a capture agent that binds to the analyte, wherein the control sample includes a known detectable amount of the analyte, and reading the control CROF device, thereby obtaining a control measurement for the known detectable amount of the analyte in a sample.

In any embodiment, the sample can be a diagnostic sample obtained from a subject, the analyte can be a biomarker, and the measured amount of the analyte in the sample can be diagnostic of a disease or a condition.

In any embodiment, the devices, systems and methods in the present invention can further include receiving or providing to the subject a report that indicates the measured amount of the biomarker and a range of measured values for the biomarker in an individual free of or at low risk of having the disease or condition, wherein the measured amount of the biomarker relative to the range of measured values is diagnostic of a disease or condition.

In any embodiment, the devices, systems and methods in the present invention can further include diagnosing the subject based on information including the measured amount of the biomarker in the sample. In some cases, the diagnosing step includes sending data containing the measured amount of the biomarker to a remote location and receiving a diagnosis based on information including the measurement from the remote location.

In any embodiment, the applying step b) can include isolating miRNA from the sample to generate an isolated miRNA sample, and applying the isolated miRNA sample to the disk-coupled dots-on-pillar antenna (CROF device) array.

In any embodiment, the method can include receiving or providing a report that indicates the safety or harmfulness for a subject to be exposed to the environment from which the sample was obtained.

In any embodiment, the method can include sending data containing the measured amount of the environmental marker to a remote location and receiving a report that indicates the safety or harmfulness for a subject to be exposed to the environment from which the sample was obtained.

In any embodiment, the CROF device array can include a plurality of capture agents that each binds to an environmental marker, and wherein the reading step d) can include obtaining a measure of the amount of the plurality of environmental markers in the sample.

In any embodiment, the sample can be a foodstuff sample, wherein the analyte can be a foodstuff marker, and wherein the amount of the foodstuff marker in the sample can correlate with safety of the foodstuff for consumption.

In any embodiment, the method can include receiving or providing a report that indicates the safety or harmfulness for a subject to consume the foodstuff from which the sample is obtained.

In any embodiment, the method can include sending data containing the measured amount of the foodstuff marker to a remote location and receiving a report that indicates the safety or harmfulness for a subject to consume the foodstuff from which the sample is obtained.

In any embodiment, the CROF device array can include a plurality of capture agents that each binds to a foodstuff marker, wherein the obtaining can include obtaining a measure of the amount of the plurality of foodstuff markers in the sample, and wherein the amount of the plurality of foodstuff marker in the sample can correlate with safety of the foodstuff for consumption.

Also provided herein are kits that find use in practicing the devices, systems and methods in the present invention.

The amount of sample can be about a drop of a sample. The amount of sample can be the amount collected from a pricked finger or fingerstick. The amount of sample can be the amount collected from a microneedle or a venous draw.

A sample can be used without further processing after obtaining it from the source, or can be processed, e.g., to enrich for an analyte of interest, remove large particulate matter, dissolve or resuspend a solid sample, etc.

Any suitable method of applying a sample to the CROF device can be employed. Suitable methods can include using a pipet, dropper, syringe, etc. In certain embodiments, when the CROF device is located on a support in a dipstick format, as described below, the sample can be applied to the CROF device by dipping a sample-receiving area of the dipstick into the sample.

A sample can be collected at one time, or at a plurality of times. Samples collected over time can be aggregated and/or processed (by applying to a CROF device and obtaining a measurement of the amount of analyte in the sample, as described herein) individually. In some instances, measurements obtained over time can be aggregated and can be useful for longitudinal analysis over time to facilitate screening, diagnosis, treatment, and/or disease prevention.

Washing the CROF device to remove unbound sample components can be done in any convenient manner, as described above. In certain embodiments, the surface of the CROF device is washed using binding buffer to remove unbound sample components.

Detectable labeling of the analyte can be done by any convenient method. The analyte can be labeled directly or indirectly. In direct labeling, the analyte in the sample is labeled before the sample is applied to the CROF device. In indirect labeling, an unlabeled analyte in a sample is labeled after the sample is applied to the CROF device to capture the unlabeled analyte, as described below.

The samples from a subject, the health of a subject, and other applications of the present invention are further described below. Exemplary samples, health conditions, and application are also disclosed in, e.g., U.S. Pub. Nos. 2014/0154668 and 2014/0045209, which are hereby incorporated by reference.

The present inventions find use in a variety of applications, where such applications are generally analyte detection applications in which the presence of a particular analyte in a given sample is detected at least qualitatively, if not quantitatively. Protocols for carrying out analyte detection assays are well known to those of skill in the art and need not be described in great detail here. Generally, the sample suspected of comprising an analyte of interest is contacted with the surface of a subject nanosensor under conditions sufficient for the analyte to bind to its respective capture agent that is tethered to the sensor. The capture agent has highly specific affinity for the targeted molecules of interest. This affinity can be antigen-antibody reaction where antibodies bind to specific epitope on the antigen, or a DNA/RNA or DNA/RNA hybridization reaction that is sequence-specific between two or more complementary strands of nucleic acids. Thus, if the analyte of interest is present in the sample, it likely binds to the sensor at the site of the capture agent and a complex is formed on the sensor surface. Namely, the captured analytes are immobilized at the sensor surface. After removing the unbounded analytes, the presence of this binding complex on the surface of the sensor (e.g. the immobilized analytes of interest) is then detected, e.g., using a labeled secondary capture agent.

Specific analyte detection applications of interest include hybridization assays in which the nucleic acid capture agents are employed and protein binding assays in which polypeptides, e.g., antibodies, are employed. In these assays, a sample is first prepared and following sample preparation, the sample is contacted with a subject nanosensor under specific binding conditions, whereby complexes are formed between target nucleic acids or polypeptides (or other molecules) that are complementary to capture agents attached to the sensor surface.

In one embodiment, the capture oligonucleotide is synthesized single strand DNA of 20-100 bases length, that is thiolated at one end. These molecules are immobilized on the nanodevices' surface to capture the targeted single-strand DNA (which can be at least 50 bp length) that has a sequence that is complementary to the immobilized capture DNA. After the hybridization reaction, a detection single strand DNA (which can be of 20-100 bp in length) whose sequence are complementary to the targeted DNA's unoccupied nucleic acid is added to hybridize with the target. The detection DNA has its one end conjugated to a fluorescence label, whose emission wavelength are within the plasmonic resonance of the nanodevice. Therefore by detecting the fluorescence emission emanate from the nanodevices' surface, the targeted single strand DNA can be accurately detected and quantified. The length for capture and detection DNA determine the melting temperature (nucleotide strands will separate above melting temperature), the extent of misparing (the longer the strand, the lower the misparing).

One of the concerns of choosing the length for complementary binding depends on the needs to minimize misparing while keeping the melting temperature as high as possible. In addition, the total length of the hybridization length is determined in order to achieve optimum signal amplification.

A subject sensor can be employed in a method of diagnosing a disease or condition, comprising: (a) obtaining a liquid sample from a patient suspected of having the disease or condition, (b) contacting the sample with a subject nanosensor, wherein the capture agent of the nanosensor specifically binds to a biomarker for the disease and wherein the contacting is done under conditions suitable for specific binding of the biomarker with the capture agent; (c) removing any biomarker that is not bound to the capture agent; and (d) reading a light signal from biomarker that remain bound to the nanosensor, wherein a light signal indicates that the patient has the disease or condition, wherein the method further comprises labeling the biomarker with a light-emitting label, either prior to or after it is bound to the capture agent. As will be described in greater detail below, the patient can suspect of having cancer and the antibody binds to a cancer biomarker. In other embodiments, the patient is suspected of having a neurological disorder and the antibody binds to a biomarker for the neurological disorder.

The applications of the subject sensor include, but not limited to, (a) the detection, purification and quantification of chemical compounds or biomolecules that correlates with the stage of certain diseases, e.g., infectious and parasitic disease, injuries, cardiovascular disease, cancer, mental disorders, neuropsychiatric disorders and organic diseases, e.g., pulmonary diseases, renal diseases, (b) the detection, purification and quantification of microorganism, e.g., virus, fungus and bacteria from environment, e.g., water, soil, or biological samples, e.g., tissues, bodily fluids, (c) the detection, quantification of chemical compounds or biological samples that pose hazard to food safety or national security, e.g. toxic waste, anthrax, (d) quantification of vital parameters in medical or physiological monitor, e.g., glucose, blood oxygen level, total blood count, (e) the detection and quantification of specific DNA or RNA from biosamples, e.g., cells, viruses, bodily fluids, (f) the sequencing and comparing of genetic sequences in DNA in the chromosomes and mitochondria for genome analysis or (g) to detect reaction products, e.g., during synthesis or purification of pharmaceuticals.

The detection can be carried out in various sample matrix, such as cells, tissues, bodily fluids, and stool. Bodily fluids of interest include but are not limited to, amniotic fluid, aqueous humour, vitreous humour, blood (e.g., whole blood, fractionated blood, plasma, serum, etc.), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine and exhaled condensate.

In certain embodiments, a subject biosensor can be used diagnose a pathogen infection by detecting a target nucleic acid from a pathogen in a sample. The target nucleic acid can be, for example, from a virus that is selected from the group comprising human immunodeficiency virus 1 and 2 (HIV-1 and HIV-2), human T-cell leukaemia virus and 2 (HTLV-1 and HTLV-2), respiratory syncytial virus (RSV), adenovirus, hepatitis B virus (HBV), hepatitis C virus (HCV), Epstein- Barr virus (EBV), human papillomavirus (HPV), varicella zoster virus (VZV), cytomegalovirus (CMV), herpes-simplex virus 1 and 2 (HSV-1 and HSV-2), human herpesvirus 8 (HHV-8, also known as Kaposi sarcoma herpesvirus) and flaviviruses, including yellow fever virus, dengue virus, Japanese encephalitis virus, West Nile virus and Ebola virus. The present invention is not, however, limited to the detection of nucleic acid, e.g., DNA or RNA, sequences from the aforementioned viruses, but can be applied without any problem to other pathogens important in veterinary and/or human medicine.

Human papillomaviruses (HPV) are further subdivided on the basis of their DNA sequence homology into more than 70 different types. These types cause different diseases. HPV types 1, 2, 3, 4, 7, 10 and 26-29 cause benign warts. HPV types 5, 8, 9, 12, 14, 15, 17 and 19-25 and 46-50 cause lesions in patients with a weakened immune system. Types 6, 11, 34, 39, 41-44 and 51-55 cause benign acuminate warts on the mucosae of the genital region and of the respiratory tract. HPV types 16 and 18 are of special medical interest, as they cause epithelial dysplasias of the genital mucosa and are associated with a high proportion of the invasive carcinomas of the cervix, vagina, vulva and anal canal. Integration of the DNA of the human papillomavirus is considered to be decisive in the carcinogenesis of cervical cancer. Human papillomaviruses can be detected for example from the DNA sequence of their capsid proteins L1 and L2. Accordingly, the method of the present invention is especially suitable for the detection of DNA sequences of HPV types 16 and/or 18 in tissue samples, for assessing the risk of development of carcinoma.

In some cases, the nanosensor can be employed to detect a biomarker that is present at a low concentration. For example, the nanosensor can be used to detect cancer antigens in a readily accessible bodily fluids (e.g., blood, saliva, urine, tears, etc.), to detect biomarkers for tissue-specific diseases in a readily accessible bodily fluid (e.g., a biomarkers for a neurological disorder (e.g., Alzheimer's antigens)), to detect infections (particularly detection of low titer latent viruses, e.g., HIV), to detect fetal antigens in maternal blood, and for detection of exogenous compounds (e.g., drugs or pollutants) in a subject's bloodstream, for example.

The following table provides a list of protein biomarkers that can be detected using the subject nanosensor (when used in conjunction with an appropriate monoclonal antibody), and their associated diseases. One potential source of the biomarker (e.g., "CSF"; cerebrospinal fluid) is also indicated in the table. In many cases, the subject biosensor can detect those biomarkers in a different bodily fluid to that indicated. For example, biomarkers that are found in CSF can be identified in urine, blood or saliva.

H) Utility

The subject method finds use in a variety of different applications where determination of the presence or absence, and/or quantification of one or more analytes in a sample are desired. For example, the subject method finds use in the detection of proteins, peptides, nucleic acids, synthetic compounds, inorganic compounds, and the like.

In certain embodiments, the subject method finds use in the detection of nucleic acids, proteins, or other biomolecules in a sample. The methods can include the detection of a set of biomarkers, e.g., two or more distinct protein or nucleic acid biomarkers, in a sample. For example, the methods can be used in the rapid, clinical detection of two or more disease biomarkers in a biological sample, e.g., as can be employed in the diagnosis of a disease condition in a subject, or in the ongoing management or treatment of a disease condition in a subject, etc. As described above, communication to a physician or other health-care provider can better ensure that the physician or other health-care provider is made aware of, and cognizant of, possible concerns and can thus be more likely to take appropriate action.

The applications of the devices, systems and methods in the present invention of employing a CROF device include, but are not limited to, (a) the detection, purification and quantification of chemical compounds or biomolecules that correlates with the stage of certain diseases, e.g., infectious and parasitic disease, injuries, cardiovascular disease, cancer, mental disorders, neuropsychiatric disorders and organic diseases, e.g., pulmonary diseases, renal diseases, (b) the detection, purification and quantification of microorganism, e.g., virus, fungus and bacteria from environment, e.g., water, soil, or biological samples, e.g., tissues, bodily fluids, (c) the detection, quantification of chemical compounds or biological samples that pose hazard to food safety or national security, e.g. toxic waste, anthrax, (d) quantification of vital parameters in medical or physiological monitor, e.g., glucose, blood oxygen level, total blood count, (e) the detection and quantification of specific DNA or RNA from biosamples, e.g., cells, viruses, bodily fluids, (f) the sequencing and comparing of genetic sequences in DNA in the chromosomes and mitochondria for genome analysis or (g) to detect reaction products, e.g., during synthesis or purification of pharmaceuticals. Some of the specific applications of the devices, systems and methods in the present invention are described now in further detail.

I) Diagnostic Method

In certain embodiments, the subject method finds use in detecting biomarkers. In certain embodiments, the devices, systems and methods in the present invention of using CROF are used to detect the presence or absence of particular biomarkers, as well as an increase or decrease in the concentration of particular biomarkers in blood, plasma, serum, or other bodily fluids or excretions, such as but not limited to urine, blood, serum, plasma, saliva, semen, prostatic fluid, nipple aspirate fluid, lachrymal fluid, perspiration, feces, cheek swabs, cerebrospinal fluid, cell lysate samples, amniotic fluid, gastrointestinal fluid, biopsy tissue, and the like. Thus, the sample, e.g. a diagnostic sample, can include various fluid or solid samples.

In some instances, the sample can be a bodily fluid sample from a subject who is to be diagnosed. In some instances, solid or semi-solid samples can be provided. The sample can include tissues and/or cells collected from the subject. The sample can be a biological sample. Examples of biological samples can include but are not limited to, blood, serum, plasma, a nasal swab, a nasopharyngeal wash, saliva, urine, gastric fluid, spinal fluid, tears, stool, mucus, sweat, earwax, oil, a glandular secretion, cerebral spinal fluid, tissue, semen, vaginal fluid, interstitial fluids derived from tumorous tissue, ocular fluids, spinal fluid, a throat swab, breath, hair, finger nails, skin, biopsy, placental fluid, amniotic fluid, cord blood, lymphatic fluids, cavity fluids, sputum, pus, microbiota, meconium, breast milk, exhaled condensate and/or other excretions. The samples can include nasopharyngeal wash. Nasal swabs, throat swabs, stool samples, hair, finger nail, ear wax, breath, and other solid, semi-solid, or gaseous samples can be processed in an extraction buffer, e.g., for a fixed or variable amount of time, prior to their analysis. The extraction buffer or an aliquot thereof can then be processed similarly to other fluid samples if desired. Examples of tissue samples of the subject can include but are not limited to, connective tissue, muscle tissue, nervous tissue, epithelial tissue, cartilage, cancerous sample, or bone.

In some instances, the subject from which a diagnostic sample is obtained can be a healthy individual, or can be an individual at least suspected of having a disease or a health condition. In some instances, the subject can be a patient.

In certain embodiments, the CROF device includes a capture agent configured to specifically bind a biomarker in a sample provided by the subject. In certain embodiments, the biomarker can be a protein. In certain embodiments, the biomarker protein is specifically bound by an antibody capture agent present in the CROF device. In certain embodiments, the biomarker is an antibody specifically bound by an antigen capture agent present in the CROF device. In certain embodiments, the biomarker is a nucleic acid specifically bound by a nucleic acid capture agent that is complementary to one or both strands of a double-stranded nucleic acid biomarker, or complementary to a single-stranded biomarker. In certain embodiments, the biomarker is a nucleic acid specifically bound by a nucleic acid binding protein. In certain embodiments, the biomarker is specifically bound by an aptamer.

The presence or absence of a biomarker or significant changes in the concentration of a biomarker can be used to diagnose disease risk, presence of disease in an individual, or to tailor treatments for the disease in an individual. For example, the presence of a particular biomarker or panel of biomarkers can influence the choices of drug treatment or administration regimes given to an individual. In evaluating potential drug therapies, a biomarker can be used as a surrogate for a natural endpoint such as survival or irreversible morbidity. If a treatment alters the biomarker, which has a direct connection to improved health, the biomarker can serve as a surrogate endpoint for evaluating the clinical benefit of a particular treatment or administration regime. Thus, personalized diagnosis and treatment based on the particular biomarkers or panel of biomarkers detected in an individual are facilitated by the subject method. Furthermore, the early detection of biomarkers associated with diseases is facilitated by the high sensitivity of the devices, systems and methods in the present invention, as described above. Due to the capability of detecting multiple biomarkers with a mobile device, such as a smartphone, combined with sensitivity, scalability, and ease of use, the presently disclosed method finds use in portable and point-of-care or near-patient molecular diagnostics.

In certain embodiments, the subject method finds use in detecting biomarkers for a disease or disease state. In certain instances, the subject method finds use in detecting biomarkers for the characterization of cell signaling pathways and intracellular communication for drug discovery and vaccine development. For example, the subject method can be used to detect and/or quantify the amount of biomarkers in diseased, healthy or benign samples. In certain embodiments, the subject method finds use in detecting biomarkers for an infectious disease or disease state. In some cases, the biomarkers can be molecular biomarkers, such as but not limited to proteins, nucleic acids, carbohydrates, small molecules, and the like.

The subject method find use in diagnostic assays, such as, but not limited to, the following: detecting and/or quantifying biomarkers, as described above; screening assays, where samples are tested at regular intervals for asymptomatic subjects; prognostic assays, where the presence and or quantity of a biomarker is used to predict a likely disease course; stratification assays, where a subject's response to different drug treatments can be predicted; efficacy assays, where the efficacy of a drug treatment is monitored; and the like.

In certain embodiments, a subject biosensor can be used diagnose a pathogen infection by detecting a target nucleic acid from a pathogen in a sample. The target nucleic acid can be, for example, from a virus that is selected from the group comprising human immunodeficiency virus 1 and 2 (HIV-1 and HIV-2), human T-cell leukaemia virus and 2 (HTLV-1 and HTLV-2), respiratory syncytial virus (RSV), adenovirus, hepatitis B virus (HBV), hepatitis C virus (HCV), Epstein-Barr virus (EBV), human papillomavirus (HPV), varicella zoster virus (VZV), cytomegalovirus (CMV), herpes-simplex virus 1 and 2 (HSV-1 and HSV-2), human herpesvirus 8 (HHV-8, also known as Kaposi sarcoma herpesvirus) and flaviviruses, including yellow fever virus, dengue virus, Japanese encephalitis virus, West Nile virus and Ebola virus. The present invention is not, however, limited to the detection of nucleic acid, e.g., DNA or RNA, sequences from the aforementioned viruses, but can be applied without any problem to other pathogens important in veterinary and/or human medicine.

Human papillomaviruses (HPV) are further subdivided on the basis of their DNA sequence homology into more than 70 different types. These types cause different diseases. HPV types 1, 2, 3, 4, 7, 10 and 26-29 cause benign warts. HPV types 5, 8, 9, 12, 14, 15, 17 and 19-25 and 46-50 cause lesions in patients with a weakened immune system. Types 6, 11, 34, 39, 41-44 and 51-55 cause benign acuminate warts on the mucosae of the genital region and of the respiratory tract. HPV types 16 and 18 are of special medical interest, as they cause epithelial dysplasias of the genital mucosa and are associated with a high proportion of the invasive carcinomas of the cervix, vagina, vulva and anal canal. Integration of the DNA of the human papillomavirus is considered to be decisive in the carcinogenesis of cervical cancer. Human papillomaviruses can be detected for example from the DNA sequence of their capsid proteins L1 and L2. Accordingly, the method of the present invention is especially suitable for the detection of DNA sequences of HPV types 16 and/or 18 in tissue samples, for assessing the risk of development of carcinoma.

Other pathogens that can be detected in a diagnostic sample using the devices, systems and methods in the present invention include, but are not limited to: Varicella zoster; *Staphylococcus epidermidis, Escherichia coli*, methicillin-resistant *Staphylococcus aureus* (MSRA), *Staphylococcus aureus, Staphylococcus hominis, Enterococcus faecalis, Pseudomonas aeruginosa, Staphylococcus capitis, Staphylococcus warneri, Klebsiella pneumoniae, Haemophilus influenzae, Staphylococcus simulans, Streptococcus pneumoniae* and *Candida albicans*; gonorrhea (*Neisseria gorrhoeae*), syphilis (*Treponena pallidum*), clamydia (*Clamyda tracomitis*), nongonococcal urethritis (*Ureaplasm urealyticum*), chancroid (*Haemophilus ducreyi*), trichomoniasis (*Trichomonas vaginalis*); *Pseudomonas aeruginosa*, methicillin-resistant *Staphylococcus aureus* (MSRA), *Klebsiella pneumoniae, Haemophilis influenzae, Staphylococcus aureus, Stenotrophomonas maltophilia, Haemophilis parainfluenzae, Escherichia coli, Enterococcus faecalis, Serratia marcescens, Haemophilis parahaemolyticus, Enterococcus cloacae, Candida albicans, Moraxiella catarrhalis, Streptococcus pneumoniae, Citrobacter freundii, Enterococcus faecium, Klebsiella oxytoca, Pseudomonas fluorescens, Neisseria meningitidis, Streptococcus pyogenes, Pneumocystis carinii, Klebsiella pneumoniae*

*Legionella pneumophila*, *Mycoplasma pneumoniae*, and *Mycobacterium tuberculosis*, etc.

In some cases, the CROF device can be employed to detect a biomarker that is present at a low concentration. For example, the CROF device can be used to detect cancer antigens in a readily accessible bodily fluids (e.g., blood, saliva, urine, tears, etc.), to detect biomarkers for tissue-specific diseases in a readily accessible bodily fluid (e.g., a biomarkers for a neurological disorder (e.g., Alzheimer's antigens)), to detect infections (particularly detection of low titer latent viruses, e.g., HIV), to detect fetal antigens in maternal blood, and for detection of exogenous compounds (e.g., drugs or pollutants) in a subject's bloodstream, for example.

One potential source of the biomarker (e.g., "CSF"; cerebrospinal fluid) is also indicated in the table. In many cases, the subject biosensor can detect those biomarkers in a different bodily fluid to that indicated. For example, biomarkers that are found in CSF can be identified in urine, blood or saliva. It will also be clear to one with ordinary skill in the art that the subject CROF devices can be configured to capture and detect many more biomarkers known in the art that are diagnostic of a disease or health condition.

A biomarker can be a protein or a nucleic acid (e.g., mRNA) biomarker, unless specified otherwise. The diagnosis can be associated with an increase or a decrease in the level of a biomarker in the sample, unless specified otherwise. Lists of biomarkers, the diseases that they can be used to diagnose, and the sample in which the biomarkers can be detected are described in Tables 1 and 2 of U.S. provisional application Ser. No. 62/234,538, filed on Sep. 29, 2015, which application is incorporated by reference herein.

In some instances, the devices, systems and methods in the present invention is used to inform the subject from whom the sample is derived about a health condition thereof. Health conditions that can be diagnosed or measured by the devices, systems and methods in the present invention, device and system include, but are not limited to: chemical balance; nutritional health; exercise; fatigue; sleep; stress; prediabetes; allergies; aging; exposure to environmental toxins, pesticides, herbicides, synthetic hormone analogs; pregnancy; menopause; and andropause. Table 3 of U.S. provisional application Ser. No. 62/234,538, filed on Sep. 29, 2015, which application is incorporated by reference herein, provides a list of biomarker that can be detected using the present CROF device (when used in conjunction with an appropriate monoclonal antibody, nucleic acid, or other capture agent), and their associated health conditions.

J) Kits

Aspects of the present disclosure include a kit that find use in performing the devices, systems and methods in the present invention, as described above. In certain embodiments, the kit includes instructions for practicing the subject methods using a hand held device, e.g., a mobile phone. These instructions can be present in the subject kits in a variety of forms, one or more of which can be present in the kit. One form in which these instructions can be present is as printed information on a suitable medium or substrate, e.g., a piece or pieces of paper on which the information is printed, in the packaging of the kit, in a package insert, etc. Another means would be a computer readable medium, e.g., diskette, CD, DVD, Blu-Ray, computer-readable memory, etc., on which the information has been recorded or stored. Yet another means that can be present is a website address which can be used via the Internet to access the information at a removed site. The kit can further include a software for implementing a method for measuring an analyte on a device, as described herein, provided on a computer readable medium. Any convenient means can be present in the kits.

In certain embodiments, the kit includes a detection agent that includes a detectable label, e.g. a fluorescently labeled antibody or oligonucleotide that binds specifically to an analyte of interest, for use in labeling the analyte of interest. The detection agent can be provided in a separate container as the CROF device, or can be provided in the CROF device.

In certain embodiments, the kit includes a control sample that includes a known detectable amount of an analyte that is to be detected in the sample. The control sample can be provided in a container, and can be in solution at a known concentration, or can be provided in dry form, e.g., lyophilized or freeze dried. The kit can also include buffers for use in dissolving the control sample, if it is provided in dry form.

Figure 9:
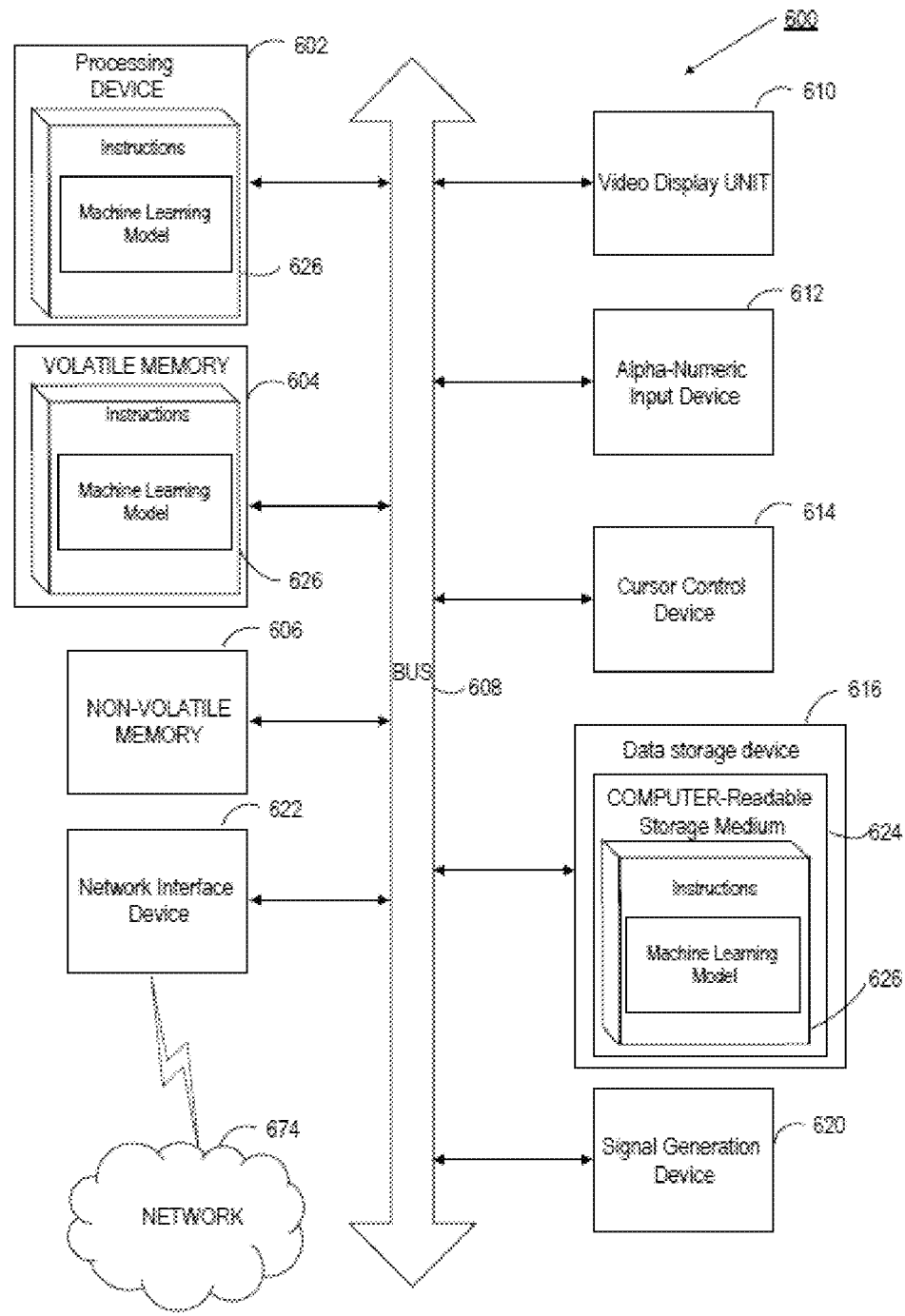
FIG. 9 depicts a block diagram of a computer system operating in accordance with one or more aspects of the present disclosure.

FIG. 9 depicts a block diagram of a computer system operating in accordance with one or more aspects of the present disclosure. In various illustrative examples, computer system 600 may be system 2 of FIG. 4.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions of the training and applying machine learning model 108 as shown in FIG. 4.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Figure 10:
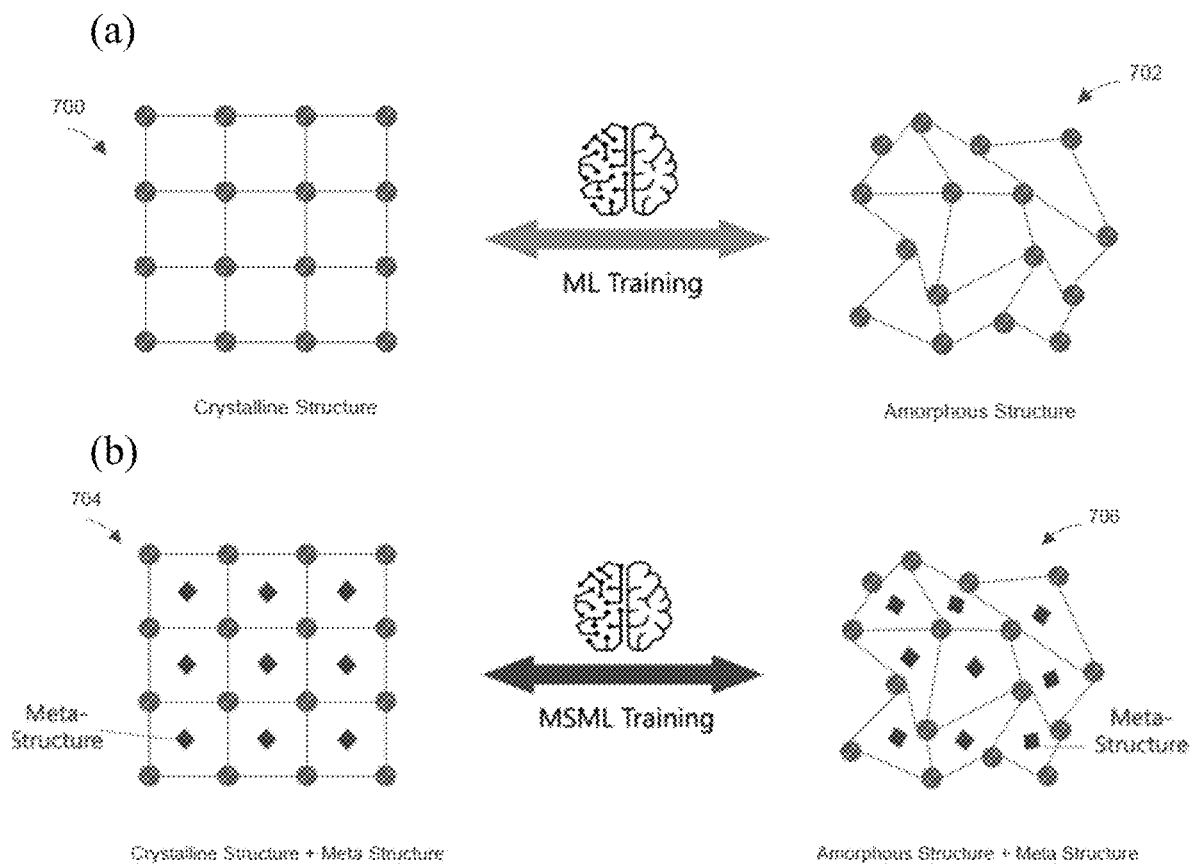
FIG. 10 (A) illustrates that the monitoring marks in the present invention are actually adding known meta structures into a lattice. When a lattice gets distorted, one always can use the knowledge of the meta structure to recovering to nearly perfect structure, hence greatly improve the accuracy of the machine learning model and the assay accuracy.

FIG. 10 (A) illustrates that the monitoring marks in the present invention are actually adding known meta structures into a lattice. When a lattice gets distorted, one always can use the knowledge of the meta structure to recovering to nearly perfect structure, hence greatly improve the accuracy of the machine learning model and the assay accuracy.

the mapping between a crystalline structure and an amorphous structure. (B) illustrates the mapping between a crystalline structure injected with a meta structure and an amorphous structure injected with the meta structure according to an embodiment of the disclosure.

Figure 11:
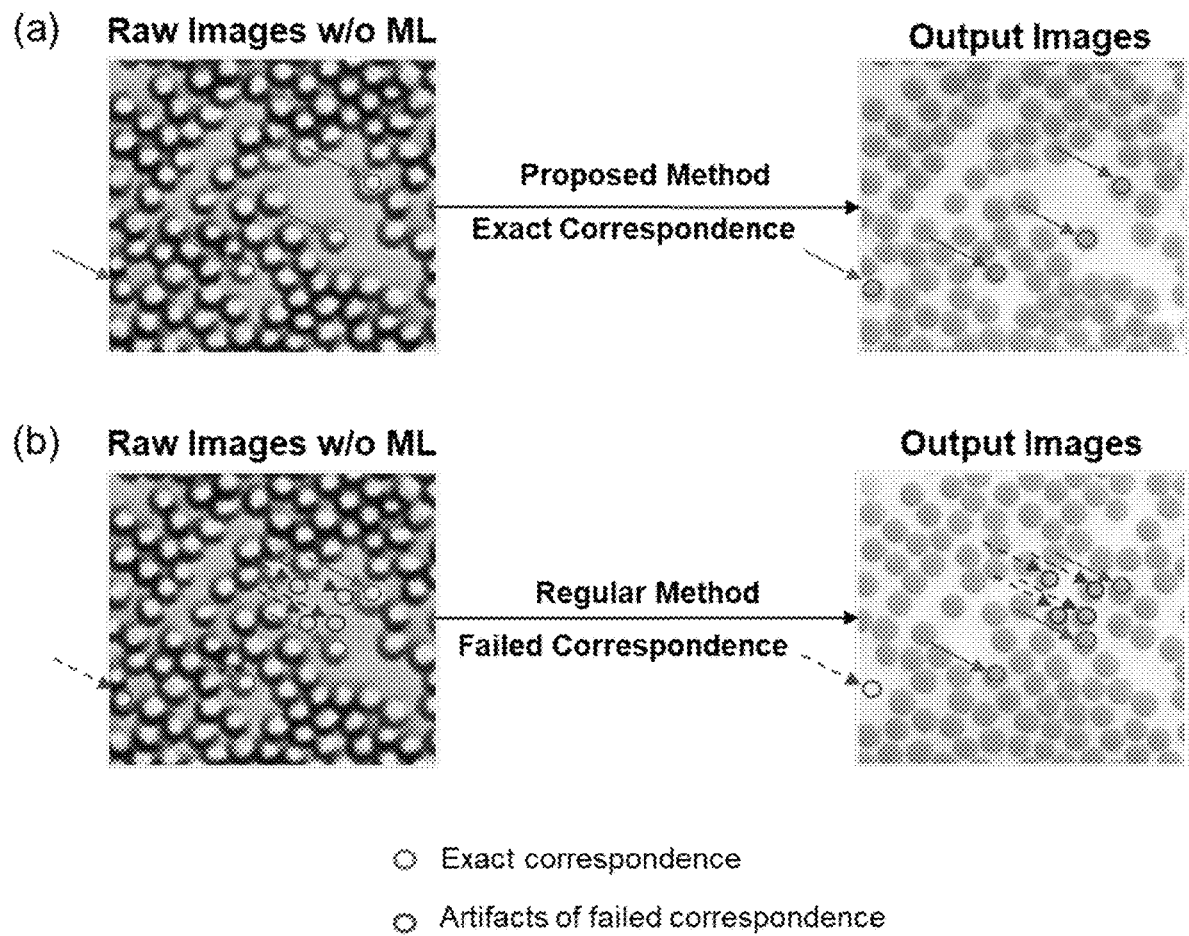
FIG. 11 illustrate an actual examples of the difference between training machine learning without using the monitoring marks (FIG. 10 (a0) which need many samples and long time to train and the test generates artifacts (missing cells and create the non-exist cells), while using the monitoring marks, the training sample number and time are significantly reduced, and the test do not generate the artifacts.

FIG. 11 illustrate an actual examples of the difference between training machine learning without using the monitoring marks (FIG. 10 (a0) which need many samples and long time to train and the test generates artifacts (missing cells and create the non-exist cells), while using the monitoring marks, the training sample number and time are significantly reduced, and the test do not generate the artifacts.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method of training a machine learning model for an image based assay, wherein a sample in the assay is, during a test, imaged by an imaging system with an imperfection, and wherein the sample contains or is suspected of containing an analyte; comprising:

having the sample forming a thin layer on an imaging area of a sample holder, wherein the sample holder comprises one or more monitoring marks in the imaging area, and wherein at least one of the geometric or optical properties of the one or more monitoring marks is predetermined and known;

imaging, using the imaging system, an original image of the sample on the imaging area of the sample holder;

correcting an imperfection in the original image using the at least one of the geometric or optical properties of the one or more monitoring marks, to generate a corrected image; and training a machine learning model using the corrected image to generate a trained model for measuring the analyte, wherein the sample holder comprises:

a first plate and a second plate that are movable to each other in different configurations, including an open configuration and a closed configuration, and the sample is disposed between the first and second plates;

a plurality of spacers on one of the two plates or both, wherein the plurality of spacers are situated between the first and second plates in the closed configuration, wherein, in the open configuration, the two plates are separated apart, and the spacing between the first and second plates is not regulated by the spacers to facilitate the deposition of the sample on one or both of the first and second plates; and in the closed configuration that is configured after the sample deposition in the open configuration, at least part of the sample is compressed by the first and second plates into a layer of substantially uniform thickness, and the substantially uniform thickness of the layer is regulated by the two plates and the spacers.

2. The method of claim 1, wherein correcting the imperfection in the original image to generate the corrected image comprises applying a spatial transform to the original image, wherein the spatial transformation uses a mapping between the positions of the one or more monitoring marks in the original image and the predetermined and known positions of the one or more monitoring marks in the sample holder.

3. A method of an image based assay using a machine learning model, wherein a sample in the assay is, during a test, imaged by an imaging system with an imperfection, and wherein the sample contains or is suspected of containing an analyte, the method comprising:
  receiving an original image, imaged by the imaging system, of an imaging area of a sample holder, wherein the imaging area of the sample holder comprises a sample and one or more monitoring marks; wherein at least one of the geometric or optical properties of the one or more monitoring marks is predetermined and known;
  correcting an imperfection in the original image using the at least one of the geometric or optical properties of the one or more monitoring marks to generate a corrected image; and
  analyzing the analyte using the machine learning model, wherein the sample holder comprises:
    a first plate and a second plate that are movable to each other in different configurations, including an open configuration and a closed configuration, and the sample is disposed between the first and second plates;
    a plurality of spacers on one of the two plates or both, wherein the plurality of spacers are situated between the first and second plates in the closed configuration,
    wherein, in the open configuration, the two plates are separated apart, and the spacing between the first and second plates is not regulated by the spacers to facilitate the deposition of the sample on one or both of the first and second plates; and
    in the closed configuration that is configured after the sample deposition in the open configuration, at least part of the sample is compressed by the first and second plates into a layer of substantially uniform thickness, and the substantially uniform thickness of the layer is regulated by the two plates and the spacers.

4. The method of claim 3, wherein correcting the imperfection in the original image to generate the corrected image comprises applying a spatial transform to the original image, wherein the spatial transformation uses a mapping between the positions of the one or more monitoring marks in the original image and the predetermined and known positions of the one or more monitoring marks in the sample holder.

5. The method of claim 3, further comprising:
  training a machine learning model using the corrected image to generate a trained model for measuring the analyte.

6. The method of claim 5, wherein correcting the imperfection in the original image to generate the corrected image comprises applying a spatial transform to the original image, wherein the spatial transformation uses a mapping between the positions of the one or more monitoring marks in the original image and the predetermined and known positions of the one or more monitoring marks in the sample holder.

7. An image-based assay system for analyzing an image of sample, wherein the sample is, during a test, imaged by an imaging system with an imperfection, and wherein the sample contains or is suspected of containing an analyte, the system comprising:
  a database system to store images; and
  a processing device, communicatively coupled to the database system, to:
  receive an original image, captured by the imaging system, of an imaging area of a sample holder, wherein the imaging area of the sample holder comprises a sample and one or more monitoring marks; wherein at least one of the geometric or optical properties of the monitoring marks is predetermined and known;
  correct an imperfection in the original image using the at least one of the geometric or optical properties of the one or more monitoring marks, generating a corrected image; and
  analyze the corrected image using a machine learning model,
  wherein the sample holder comprises:
    a first plate and a second plate that are movable to each other in different configurations, including an open configuration and a closed configuration, and the sample is disposed between the first and second plates;
    a plurality of spacers on one of the two plates or both, wherein the plurality of spacers are situated between the first and second plates in the closed configuration,
    wherein, in the open configuration, the two plates are separated apart, and the spacing between the first and second plates is not regulated by the spacers to facilitate the deposition of the sample on one or both of the first and second plates; and
    in the closed configuration that is configured after the sample deposition in the open configuration, at least part of the sample is compressed by the first and second plates into a layer of substantially uniform thickness, and the substantially uniform thickness of the layer is regulated by the two plates and the spacers.

8. The system of claim 7, wherein a training of the machine learning model uses an image that is corrected using the one or more monitoring marks on a second sample holder which is identical to the sample holder.

9. The system of claim 7, wherein correcting the imperfection in the original image to generate the corrected image comprises a spatial transform that uses a mapping between the positions of the one or more monitoring marks in the original image and the predetermined and known positions of one or more monitoring marks in the sample holder.

10. The method of claim 2, wherein the analyte is a cell.

11. The method of claim 3, wherein the analyte is a cell.

12. The method of claim 1, wherein the sample holder comprises the one or more monitoring marks, and wherein the one or more monitoring marks comprise pillars at predetermined positions on at least one of the first plate and the second plate, wherein the first and second plates have a spacing of 200 µm or less, and wherein the sample is sandwiched between the first and second plates.

13. The method of claim 3, wherein the sample holder comprises the one or more monitoring marks, and wherein the one or more monitoring marks comprise pillars at predetermined positions on at least one of the first plate and the second plate, wherein the first and second plates have a spacing of 200 µm or less, and wherein the sample is sandwiched between the first and second plates.

14. The system of claim 7, wherein the sample holder comprises a the one or more monitoring marks, and wherein the one or more monitoring marks comprise pillars at predetermined positions on at least one of the first plate and the second plate, wherein the first and second plates have a spacing of 200 μm or less, and wherein the sample is sandwiched between the first and second plates.

15. The method of claim 1, wherein the one or more monitoring marks have predetermined positions on at least one of the first plate and the second plate, the predetermined positions of the one or more monitoring marks are positioned periodically on the sample holder with a periodicity value of 200 μm or less.

16. The method of claim 3, wherein the one or more monitoring marks have predetermined positions on at least one of the first plate and the second plate, the predetermined positions of the one or more monitoring marks are positioned periodically on the sample holder with a periodicity value of 200 μm or less.

17. The system of claim 7, wherein the one or more monitoring marks have predetermined positions on at least one of the first plate and the second plate, the predetermined positions of the one or more monitoring marks are positioned periodically on the sample holder with a periodicity value of 200 μm or less.

18. The method of claim 1, wherein the one or more monitoring marks have predetermined positions on at least one of the first plate and the second plate, the predetermined positions of the one or more monitoring marks in the first image are distributed periodically with at least one periodicity value, and wherein detecting the locations of the one or more monitoring marks in the first image comprises:
   detecting, using a second machine learning model, the locations of the one or more monitoring marks in the first image; and
   correcting, using the at least one periodicity value, an error in the detected locations of the one or more monitoring marks in the first image.

19. The method of claim 3, wherein the one or more monitoring marks have predetermined positions on at least one of the first plate and the second plate, the predetermined positions of the one or more monitoring marks in the first image are distributed periodically with at least one periodicity value, and wherein detecting the locations of the one or more monitoring marks in the first image comprises:
   detecting, using a second machine learning model, the locations of the one or more monitoring marks in the first image; and
   correcting, using the at least one periodicity value, an error in the detected locations of the one or more monitoring marks in the first image.

20. The system of claim 7, wherein:
   the one or more monitoring marks have predetermined positions on at least one of the first plate and the second plate, the predetermined positions of the one or more monitoring marks in the first image are distributed periodically with at least one periodicity value, and
   the processing device detects the locations of the one or more monitoring marks in the first image, comprising:
     (i) detecting, using a second machine learning model, the locations of the one or more monitoring marks in the first image; and
     (ii) correcting, using the at least one periodicity value, an error in the detected locations of the one or more monitoring marks in the first image.

21. The method of claim 1, wherein the monitoring marks comprise pillars at the predetermined positions on at least one of the first plate and the second plate, and wherein the sample is sandwiched between the first and second plates.

22. The method of claim 3, wherein the monitoring marks comprise pillars at the predetermined positions on at least one of the first plate and the second plate, and wherein the sample is sandwiched between the first and second plates.

23. The system of claim 7, wherein the monitoring marks comprise pillars at the predetermined positions on at least one of the first plate and the second plate, and wherein the sample is sandwiched between the first and second plates.

24. The method of claim 1, wherein
   the plurality of spacers has a height of 200 μm or less.

25. The system of claim 7, wherein
   a the plurality of spacers has a height of 200 μm or less.

26. The method of claim 18, wherein the spacers are the monitoring markers.

27. The system of claim 19, wherein the spacers are the monitoring markers.

28. The method of claim 1, wherein the one or more monitoring marks comprise at least four monitoring marks each having a pillar shape, wherein the four monitoring marks define four corners in a defined region in the image region of the sample holder, and the method is further comprising:
   detecting the locations of the four monitoring marks in the image;
   performing a spatial transform of the defined region using a mapping between the locations of the four monitoring marks the predetermined positions of the four monitoring marks in the sample holder, to generate the corrected image.

29. The method of claim 3, wherein the one or more monitoring marks comprise at least four monitoring marks each having a pillar shape, wherein the four monitoring marks define four corners in a defined region in the image region of the sample holder, and the method is further comprising:
   detecting the locations of the four monitoring marks in the image;
   performing a spatial transform of the defined region using a mapping between the locations of the four monitoring marks the predetermined positions of the four monitoring marks in the sample holder, to generate the corrected image.

30. The system of claim 7, wherein the one or more monitoring marks comprise at least four monitoring marks each having a pillar shape, wherein the four monitoring marks define four corners in a defined region in the image region of the sample holder, and the system is further to:
   detect the locations of the four monitoring marks in the image;
   perform a spatial transform of the defined region using a mapping between the locations of the four monitoring marks the predetermined positions of the four monitoring marks in the sample holder, to generate the corrected image.

31. The system of claim 7, wherein the thickness of the sample layer is 100 μm or less.

32. The method of claim 1, wherein each of the monitoring markers has a pillar shape and arranged periodically.

33. The method of claim 2, wherein each of the monitoring markers has a pillar shape and are arranged periodically.

34. The method of claim 3, wherein each of the monitoring markers has a pillar shape and are arranged periodically.

35. The system of claim 7, wherein each of the monitoring markers has a pillar shape and arranged periodically.

36. The method of claim 1, wherein the sample is selected from cells, tissues, bodily fluids, stool, amniotic fluid, aqueous humour, vitreous humour, blood, whole blood, fractionated blood, plasma, serum, breast milk, cerebrospinal fluid, cerumen, chyle, chime, endolymph, perilymph, feces, gastric acid, gastric juice, lymph, mucus, nasal drainage, phlegm, pericardial fluid, peritoneal fluid, pleural fluid, pus, rheum, saliva, sebum, semen, sputum, sweat, synovial fluid, tears, vomit, urine, and exhaled breath condensate.

37. The method of claim 1, wherein the analyte comprises proteins, nucleic acids, and other biomolecules.

38. The method of claim 1, wherein the image based assay is for blood cell counting, and the analyte comprises cells.

39. The method of claim 3, wherein an imperfection in the image to be corrected comprises an imperfection in optical components and conditions including optical attenuator, beam splitter, depolarizer, diaphragm, diffractive beam splitter, diffuser, ground glass, lens, littrow prism, multifocal diffractive lens, nanophotonic resonator, nuller, optical circulator, optical isolator, optical microcavity, photonic integrated circuit, pinhole (optics), polarizer, primary mirror, prism, q-plate, retroreflector, spatial filter, spatial light modulator, virtually imaged phased array, waveguide (optics), waveplate, or zone plate.

40. The method of claim 3, wherein an imperfection in the image to be corrected comprises an imperfection in light illumination and conditions including one or more of light source intensity, light source spectra, light source color, light source direction, light source brightness, light source contrast, light source wavelength band width, light source coherence, light source phase, and light source polarization.

41. The method of claim 1, wherein the machine learning model comprises a cycle generative adversarial network (CycleGAN) comprising a forward generative adversarial network (forward GAN) and a backward GAN, wherein the forward GAN comprises a first generator and a first discriminator, and the backward GAN comprises a second generator and a second discriminator.

* * * * *